US007870352B2

(12) United States Patent
Stalker

(10) Patent No.: US 7,870,352 B2
(45) Date of Patent: Jan. 11, 2011

(54) STATE-BASED MEMORY UNLOADING

(76) Inventor: Altan J. Stalker, 559 Misty Lake La., Lawrenceville, GA (US) 30043

( * ) Notice: Subject to any disclaimer, the term of this patent is extended or adjusted under 35 U.S.C. 154(b) by 1057 days.

(21) Appl. No.: 10/712,655

(22) Filed: Nov. 13, 2003

(65) Prior Publication Data

US 2005/0120385 A1     Jun. 2, 2005

(51) Int. Cl.
*G06F 12/00*     (2006.01)
*G06F 13/00*     (2006.01)
*G06F 13/28*     (2006.01)

(52) U.S. Cl. ................... 711/159; 711/158; 711/160; 711/E12.069; 711/E12.07

(58) Field of Classification Search ................... None
See application file for complete search history.

(56) References Cited

U.S. PATENT DOCUMENTS

| 5,563,648 A | 10/1996 | Menand et al. ............... 348/13 |
| 6,430,570 B1 | 8/2002 | Judge |
| 6,629,227 B1 | 9/2003 | Jerding et al. ............... 711/170 |
| 2002/0188461 A1* | 12/2002 | Matsumoto ................... 705/1 |
| 2004/0093619 A1* | 5/2004 | Cox ........................... 725/110 |

FOREIGN PATENT DOCUMENTS

| WO | WO9957875 | 11/1999 |
| WO | WO0104743 | 1/2001 |
| WO | WO02079973 | 10/2002 |
| WO | WO 2005 050995 A2 | 2/2005 |

OTHER PUBLICATIONS

"Beginners Guide to Microsoft Word XP" Edition 1.1, Aug. 2002 Information systems services, University of Leeds, http://www.leeds.ac.uk/iss/documentation/beg/beg39/beg39.html.*
"Object-Oriented Interface Design" IBM Common User Access Guidelines, IBM, Published by QUE, First Edition, Dec. 1992 p. 225.*
Scientific-Atlanta, Inc. Pending U.S. Appl. No. 09/541,939, Filing Date: Apr. 3, 2000, Title: "Service Resource Environment Management System," Inventor: Dean F. Jerding.
Anderson G, Anderson P: "Enterprise JavaBeans Component Architecture: Designing and Coding Enterprise Applications (Sample Chapters)" [Online] 2002, Prentice Hall, XP002376621 Retrieved from the Internet: URL:http://www.phptr.com/bookstore/.
Smith S L, Mosier J N: "Guidelines for Designing User Interface Software" Report EDF-TR-86-278, The Mitre Corporation, Bedford, Massachusetts, USA, Aug. 1986, XP002395090 p. 242, guideline 3.5/7.

(Continued)

*Primary Examiner*—Matt Kim
*Assistant Examiner*—Michael Alsip
(74) *Attorney, Agent, or Firm*—Merchant & Gould

(57) ABSTRACT

A system is described for managing memory, the system including, among other things, a memory with logic and a processor configured with the logic to receive an indication of an application state from a plurality of applications in memory and determine which of the plurality of applications to effect removal from the memory based on the received indication.

23 Claims, 15 Drawing Sheets

OTHER PUBLICATIONS

European Communication mailed Jun. 27, 2006 in EP Application No. 04801087.02-2223, pp. 1-2.
European Communication mailed Jan. 15, 2007 in EP Application No. 04801087.0-2223, pp. 1-2.
European Communication mailed Jan. 12, 2007 in EP Application No. 04801087.0-2211, pp. 1-4.
International Search Report mailed Aug. 31, 2006, in PCT Application No. PCT/US2004/038400, pp. 1-18.
Canadian Office Action dated May 19, 2009 cited in Application No. 2,546,128.
Mexican First Office Action dated Apr. 22, 2009 cited in Application No. PA/a/2006/005351.
Mexican Second Office Action dated Aug. 27, 2009 cited in Application No. PA/a/2006/005351.
Mexican Third Office Action dated Feb. 10, 2010 cited in Application No. PA/a/2006/005351.
Canadian Office Action dated July 21, 2010 cited in Application No. 2,546,128.

* cited by examiner

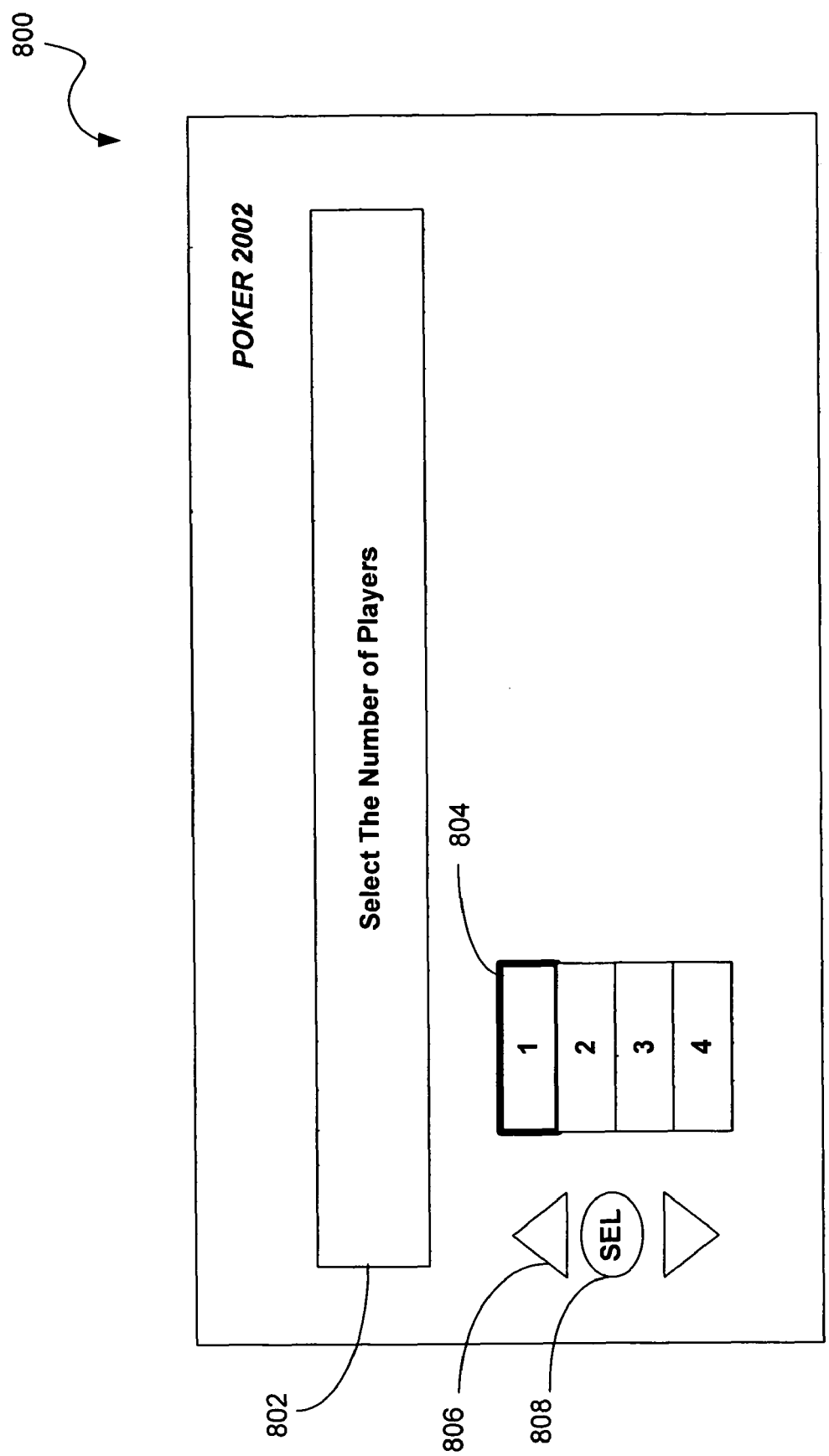

void ctl_SetState (unsigned long theState, const Ctl_UnloadInfo * uio);     /* theState = kCtl_Stateless or kCtl_Stateful */ — 940

FIG. 9B

```
typedef struct Ctl_UnloadInfo {      ─ 944
    const char * explainStr;          ─ 946
    const char * unloadMeStr;         ─ 948
    const char * unloadStopStr;       ─ 950
    Boolean stateRecord;              ─ 952
} Ctl_UnloadInfo;                     ─ 954
```
942

FIG. 9C void ctl_SetStateRecord (const char * appName, const Ctl_StateRecord * record) }—1040

FIG. 10C typedef struct Ctl_StateRecord { ←1046
unsigned long version; ←1048
unsigned long privateDataSize; ←1050
char privateData[1]; //variable sized ←1052
} Ctl_StateRecord; ←1054
}—1042

FIG. 10D void ctl_GetStateRecord (const char * appName, const Ctl_StateRecord * * record) } 1044

FIG. 10E

STATE-BASED MEMORY UNLOADING

TECHNICAL FIELD

The present disclosure is generally related to television systems, and, more particularly, is related to memory management in television systems.

BACKGROUND

With recent advances in digital transmission technology, subscriber television systems are now capable of providing much more than the traditional analog broadcast video. In implementing enhanced programming, the home communication terminal ("HCT"), otherwise known as the set-top box, has become an important computing device for accessing content services (and content within those services) and navigating a user through a maze of available services. In addition to supporting traditional analog broadcast video functionality, digital HCTs (or "DHCTs") now also support an increasing number of two-way digital services such as video-on-demand and personal video recording.

Typically, a DHCT is connected to a cable or satellite system, or generally, a subscriber television system, and includes hardware and software necessary to provide the functionality of the digital television system at the user's site. Some of the software executed by a DHCT can be downloaded and/or updated via the subscriber television system. When software is unloaded from memory, such as to free memory space for other software, systems often lack discernment as to what software to unload from memory, particularly software that operates at a higher-level of control. Even systems that employ methods for organized software flow into and out of memory often degrade the user experience. For example, some systems may employ a prioritization methodology that removes the software that consumes the most memory space when memory space is needed. Unfortunately, the software that consumes the most memory space will typically be the software that is removed, which may increase the time consumed to reload such software when it is needed. Such careless management of the unloading and/or reloading of software out of and into memory can lead to user dissatisfaction in the performance of the subscriber television system, among other problems. Thus, a need exists in the industry to address the aforementioned and/or other deficiencies and/or inadequacies.

BRIEF DESCRIPTION OF THE DRAWINGS

The preferred embodiments of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 8 is a screen diagram illustrating the example poker game of FIG. 5 returned to a start-up status after being unloaded and reloaded without saving the application state, in accordance with one embodiment of the disclosure.

FIGS. 9B-9C are programming diagrams of an example applications programming interface (API) and associated data structure, respectively, wherein the API is preferably called by an application each time the application state transitions from stateless to stateful or from stateful to stateless, in accordance with one embodiment of the disclosure.

FIGS. 10C-10D are programming diagrams that illustrate an example API and associated data structure, respectively, wherein the API enables an application to provide state information to a master controller, in accordance with one embodiment of the disclosure.

FIG. 10E is a programming diagram that illustrates an example API that enables an application to retrieve state information from a master controller, in accordance with one embodiment of the disclosure.

DETAILED DESCRIPTION OF THE PREFERRED EMBODIMENTS

Figure 1:
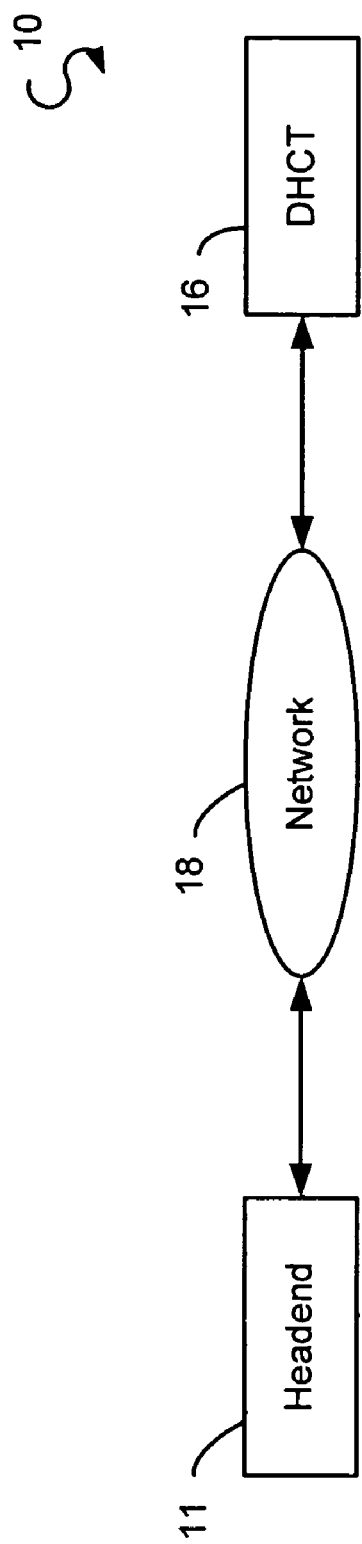
FIG. 1 is a block diagram depicting an example subscriber television system (STS), in accordance with one embodiment of the disclosure.

The preferred embodiments of the disclosure now will be described more fully hereinafter with reference to the accompanying drawings. The preferred embodiments of the disclosure will herein be described in the context of a subscriber television system, with the understanding that other communication systems can similarly benefit, including home entertainment systems, building management systems, among others. In particular, the preferred embodiments of the disclosure include systems and methods for enabling applications and/or other modules to be intelligently unloaded (e.g., removed) from memory and reloaded with minimal interference to the user. The preferred embodiments of the disclosure also include systems and methods that provide the user with information regarding the effect of unloading an application.

The preferred embodiments of the disclosure decide which applications are the preferred applications to unload according to predefined criteria. If applications that are not the preferred applications to unload need to be unloaded, the preferred embodiments of the disclosure minimize the effect on the user experience as will be described below. An application will herein be understood to include packaged functionality comprising anywhere from a single line of code to multiple lines of code that accepts an input, such as a passed variable or user input, and performs one or more operations that result in an output. Herein emphasis will be placed on applications that provide a service in a subscriber television system (e.g., pay-per-view service, on-demand services, games, web browsing, etc.), with the understanding that other systems that can benefit from memory management are similarly within the scope of the preferred embodiments of the disclosure.

From time to time it may be necessary for applications to be removed from a digital home communication terminal (DHCT) memory to enable other operations to be implemented. Applications may have state information, such as information indicating whether the application is in one of two or more stages of operation such as whether operation has proceeded from initial start-up of a poker game or whether an application has signed-on to an instant messaging server, among others. Unloading these applications in conventional systems will cause this state information to be lost. If no notification is given to the user and the application is unloaded, reloading the application (e.g., transparently to the user) without the state information may cause confusion (e.g., the user may wonder, "what happened to my poker hand?" or "Why do I need to sign-on again?"). The systems and methods of the preferred embodiments enable an application to dynamically inform a master controller of the application state (e.g., using state information). The master controller is an entity responsible for prioritizing which applications to load and unload. The state information includes data explaining the result of removing the application from memory in a user-understandable form. The master controller communicates with an entity responsible for unloading and reloading of applications to enable such operations to occur intelligently. Although the functionality of the preferred embodiments is distributed among several modules, it will be understood that one or more of the below mentioned functionality may be integrated into fewer or more modules.

During the execution of application code, the application will preferably notify the master controller each time the state changes. Possible states generally include "stateless," which includes the situation where an application can be unloaded and reloaded without the user knowing the difference, or "stateful," which includes a situation where the application is maintaining a user state (e.g., currently running or activated) and if unloaded causes operations and/or the manifestation of operations (e.g., a user interface (UI) on a display screen) to appear different to the user when reloaded. As will be described below, there are variations of the stateful state as well, in which an application is stateful and either supports or does not support state information. For example, when the application informs the master controller that it is stateful, it has the ability to provide application-specific state data to the master controller. The master controller can store this data when the application is unloaded, and then provide it back to the application when reloaded. The master controller can utilize the knowledge that the application is stateless or stateful when deciding which application to unload.

Furthermore, each time the application notifies the master controller of its state, it preferably provides an information object. This information object allows the master controller to intelligently communicate to the user the result of unloading an application. The ability to present options (e.g., a UI with selectable options such as "OK","cancel," etc.) also exists. The information object can include almost any media, including text, graphics, and/or sound. The master controller has the choice of allowing the information object options to be presented, or to force a simple acknowledgement. It will be understood by those having ordinary skill in the art that a designer of an application may choose to decide whether something is stateless or stateful. For example, an application may have a defined state, but the state has such minimal effect that the designer may decide the overhead (memory, etc.) of storing the state is an unnecessary burden.

The preferred embodiments are described with a master controller deciding on whether to unload an application based on a state communicated by an application. Thus, the various state distinctions can be viewed more objectively from the perspective of the master controller in its communications with the application to be unloaded rather than on the perceptions of the user. In other words, it is the perception of the impact on the user experience "in the opinion of" the application, whether or not a user would agree. For example, when an application communicates to the master controller that it is stateless, the master controller can unload the application since the application has communicated to it that the unloading can be implemented without any significant interruption of the user experience. If the application conveys to the master controller that it is stateful with a state record, the master controller similarly unloads the application with the understanding acquired from the application that it does so without degrading the user experience. Also, when an application communicates that it is stateful without a state record, then the master controller embarks with steps to ensure the interruption to the user experience is at the very least informed, since in this circumstance, the application has communicated to it that unloading will degrade the user experience. This reliance on the judgment or discernment of the application provides for flexibility on state-issues.

Although the preferred embodiments of the disclosure are described with a master controller that intelligently unloads applications based on application state input, other embodiments may provide for the master controller deciding state, and further embodiments may provide a mixture of intelligence state discernment shared between the application and the master controller.

A brief overview will provide a map or guide to the description that follows. Because the preferred embodiments of the disclosure can be understood in the context of a subscriber television system, an example subscriber television system is described, followed by descriptions of the primary components included in an example headend and an example DHCT, as well as an example input device to enable a user to interact with the DHCT. Several example screen diagrams are then used to provide an illustration of a problem with unloading and reloading of applications in one implementation. A couple of flow diagrams are used to illustrate some example methods utilized by the preferred embodiments of the disclosure to enable the intelligent unloading and reloading of information. These diagrams provide a perspective from an application and from a master controller. Finally, some example applications programming interfaces (APIs) are described along with corresponding data structure code, the APIs enabling the master controller and an application to communicate when providing and receiving state information, among other functions.

The preferred embodiments of the disclosure may, however, be embodied in many different forms and should not be construed as limited to the embodiments set forth herein; rather, these embodiments are provided so that this disclosure will be thorough and complete, and will fully convey the scope of the disclosure to those having ordinary skill in the art. For example, the preferred embodiments of the disclosure provide a benefit to platforms with or without a hard drive, although the ability to save state information is facilitated when platforms using a hard drive are implemented. One implementation may have the master controller of the preferred embodiments saving the state (e.g., saving state information) to RAM or to a hard drive or other storage (e.g., such as a server on a network). The preferred embodiments of the disclosure, in addition to providing an indication to the user of the effect of unloading an application, enables the state to be saved in environments that typically may not support saving state. For example, the preferred embodiments of the disclosure enables applications to save state even when operating in broadcast-only modes (e.g., no 2-way communication) on DHCTs with no hard drives if the implementation uses RAM. In addition, in some systems that include a hard drive, the writing of state information to the hard drive by applications may be encumbered by design constraints or other access limitations. Such systems can also benefit from the preferred embodiments of the disclosure. Furthermore, all "examples" given herein are intended to be non-limiting, and are included as examples among many others contemplated and within the scope of the preferred embodiments of the disclosure.

FIG. 1 is a block diagram depicting an example subscriber television system (STS) 10. In this example, the STS 10 includes a headend 11 and a digital home communication terminal (DHCT) 16 that are coupled via a communications network 18. It will be appreciated that the STS 10 shown in FIG. 1 is merely illustrative and should not be construed as implying any limitations upon the scope of the preferred embodiments of the disclosure. For example, although single components (e.g., a headend and a DHCT) are illustrated in FIG. 1, the STS 10 can feature a plurality of any one of the illustrated components, or may be configured with alternative embodiments for any one of the individual components or with yet other additional components not enumerated above. Subscriber television systems also included within the scope of the preferred embodiments of the disclosure include systems not utilizing physical structured cabling for transmission, such as, but not limited to, satellite systems.

A DHCT 16 is typically situated at the residence or place of business of a user and may be a stand-alone unit or integrated into another device such as, for example, a television set, a personal computer, or other display devices, or an audio device. The DHCT 16 receives signals (video, audio and/or other data) from the headend 11 through the network 18 and provides any reverse information to the headend 11 through the network 18. In some analog embodiments, a home communication terminal (HCT), not DHCT, is utilized. Also, functionality discussed herein may reside in personal computers, television sets, etc.

The headend 11 receives, among other data and/or content, program guide data from a program guide provider (not shown). The program guide data comprises information about services that may be provided via the DHCT 16. The headend 11 edits the program guide data and transmits the edited program guide data to the DHCT 16 via the network 18. The headend 11 may include one or more server devices (not shown) that provide video, audio, and/or data to client devices such as the DHCT 16. The headend 11 and the DHCT 16 cooperate to provide a user with television services via the television set (not shown). The television services may include, for example, broadcast television services, cable television services, premium television services, video-on-demand (VOD) services, and/or pay-per-view (PPV) services, among others.

Figure 2:
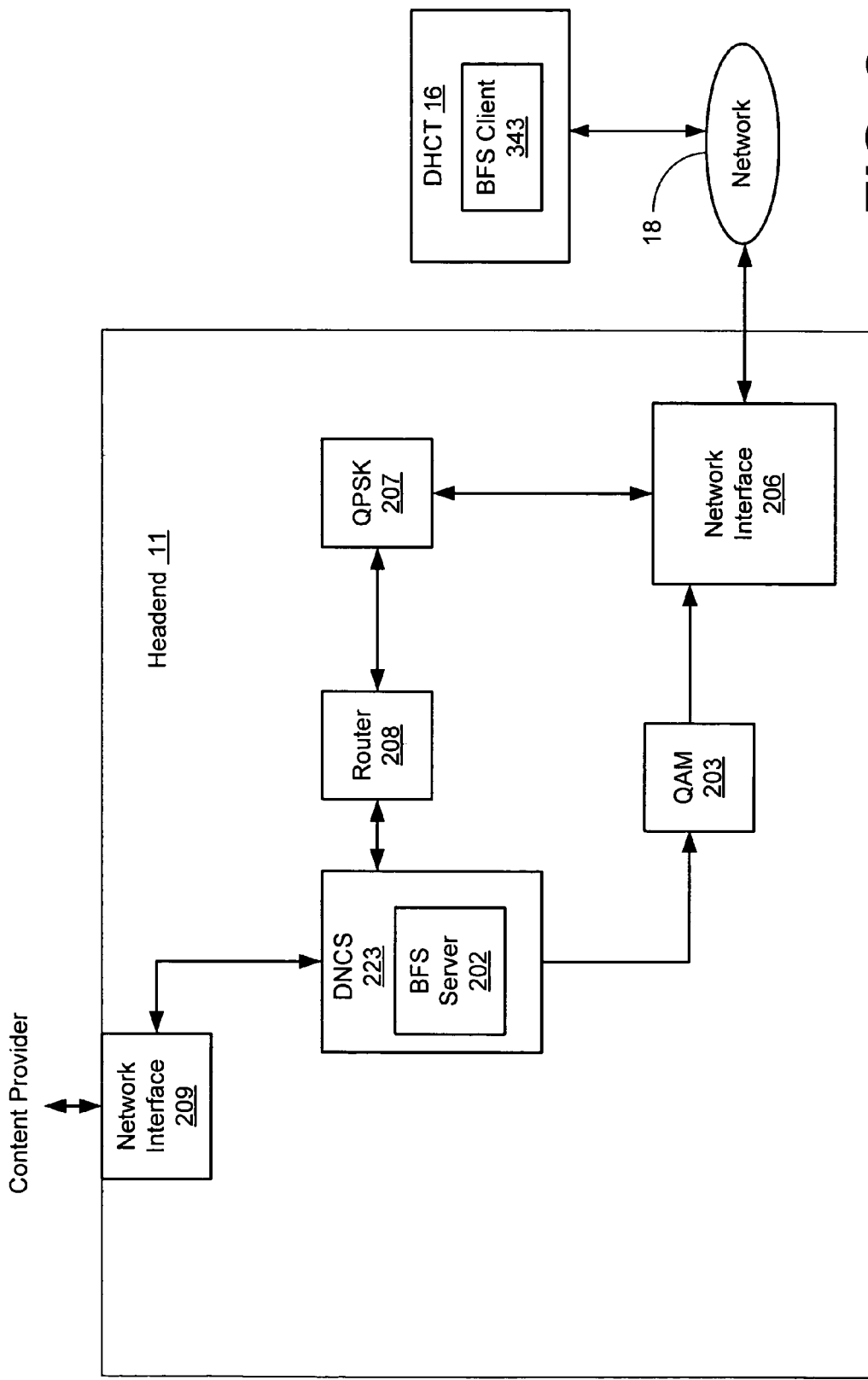
FIG. 2 is a block diagram depicting an example of selected components of a headend as depicted in FIG. 1, in accordance with one embodiment of the disclosure.

FIG. 2 depicts an example headend 11 with selected components that are configured in accordance with one embodiment of the present disclosure. It will be understood that the headend 11 shown in FIG. 2 is merely illustrative and should not be construed as implying any limitations upon the scope of the preferred embodiments of the disclosure. The headend 11 receives content from a variety of service and content providers, which can provide input in a variety of ways. The headend 11 combines the content from the various sources and distributes the content to subscribers via the distribution systems of the network 18. The input signals may be transmitted from sources to the headend 11 via a variety of transmission mechanisms, including satellites (not shown) and terrestrial broadcast transmitters and antennas (not shown).

A digital network control system (DNCS) 223 provides management, monitoring, and/or control of the network's elements and of the broadcast services provided to users. For example, a content provider such as a program guide information provider transmits data for television program guides through a network interface 209 to the DNCS 223 of the headend 11, preferably using a file transfer protocol (FTP). Although shown in an implementation of providing program guide information through the DNCS 223, it will be understood that other content providers that provide additional services are contemplated to be within the scope of the preferred embodiments, as are varying routes through the headend 11 that do not necessarily include the DNCS 223. The DNCS 223 includes functionality that defines relationships between channel names listed in the program guide data received from the program guide information provider and the numbered channels that are available via the DHCT 16. This functionality is used by the DNCS 223 to edit the program guide data to include channel numbers that correspond to the listed channel names. After the program guide data is edited by the DNCS 223, it is transmitted to the DHCT 16 preferably using a broadcast file system (BFS) server 202. The BFS server 202 and its counterpart, a BFS client module 343 in the DHCT 16, are part of a file broadcasting system. The BFS server 202 repeatedly sends data through a network interface 206 to the DHCT 16. via a quadrature amplitude modulation (QAM) modem 203 over a period of time in a cyclical manner so that the DHCT 16 may access the data as needed. Of course other mechanisms and techniques may be utilized to transfer data to the DHCT 16.

A quadrature phase shift keying (QPSK) modem 207 is responsible for transporting out-of-band IP (internet protocol) datagram traffic between the distribution headend 11 and a DHCT 16. Data transmitted or received by the QPSK modem 207 may be routed by a headend router 208. The headend router 208 may be used to deliver upstream data to the various server applications (not shown).

Figure 3:
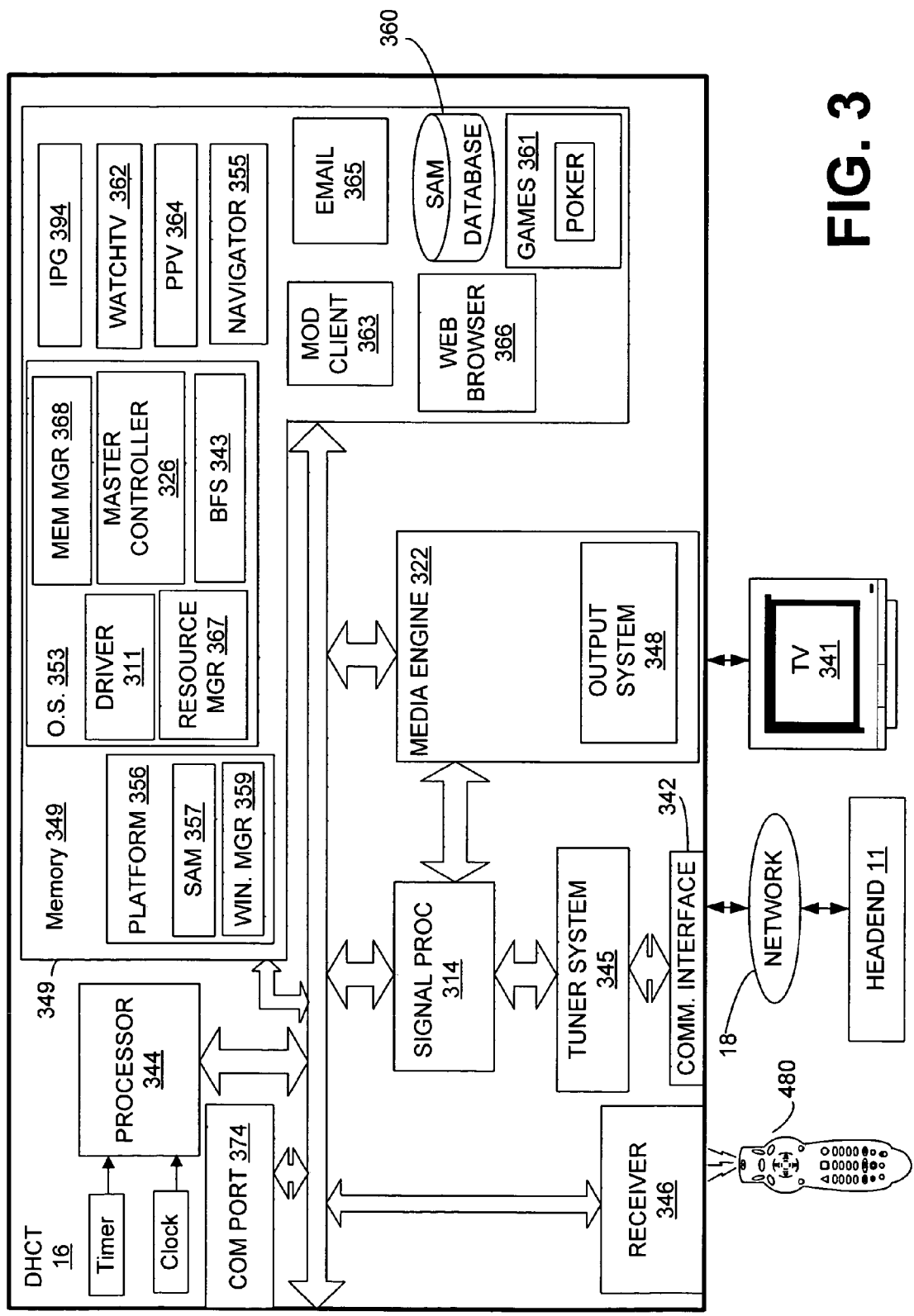
FIG. 3 is a block diagram illustrating an example digital home communication terminal (DHCT) as depicted in FIG. 1, which is coupled to a headend and to a television set, in accordance with one embodiment of the disclosure.

FIG. 3 is a block diagram illustration of an example DHCT 16 that is coupled to a headend 11 and to a television set 341, in accordance with one embodiment of the disclosure. It will be understood that the DHCT 16 shown in FIG. 3 is merely illustrative and should not be construed as implying any limitations upon the scope of the preferred embodiments of the disclosure. For example, some of the functionality performed by applications executed in the DHCT 16 (such as an MOD application 363) may instead be performed completely or in part at the headend 11 and vice versa, or not at all in some embodiments. The DHCT 16 preferably includes a communications interface 342 that receives signals (video, audio and/or other data) from the headend 11 through the network 18, and may provide reverse information to the headend 11 through the network 18.

The DHCT 16 preferably includes one or more processors, such as processor 344 (e.g., a central processing unit or digital signal processor), for controlling operations of the DHCT 16, an output system 348 for driving the television set display, and at least one tuner system 345 for tuning into a particular television channel or frequency to present content and for sending and receiving various types of data or content to and from the headend 11. The DHCT 16 may include, in other embodiments, multiple tuners for receiving downloaded (or transmitted) content. The tuner system 345 enables the DHCT 16 to tune to downstream content transmissions, thereby allowing a user to receive digital and/or analog content delivered in the downstream transmission via the subscriber television system 10 (FIG. 1). The tuner system 345 includes, in one implementation, an out-of-band tuner for bi-directional QPSK data communication and one or more QAM tuners (in band) for receiving television signals. Additionally, a receiver 346 receives externally generated information, such as user inputs or commands from an input device, such as remote control device 480, or other devices.

The DHCT 16 processes analog and/or digital transmission signals for storage in a storage device such as an optical or hard disk drive (not shown), and/or for display to the television set 341. The DHCT 16 preferably includes a signal processing system 314 and a media engine 322. The components of the signal processing system 314 are capable of QAM demodulation, forward error correction, and demultiplexing of MPEG-2 transport streams, and parsing of elementary streams and packetized elementary streams. Additional components, not shown, may include an analog decoder and compression engine for processing an analog transmission signal and, in one implementation, converting it to compressed audio and video streams that are produced in accordance with the syntax and semantics of a designated audio and video coding method, such as specified by the MPEG-2 audio and MPEG-2 video ISO (International Organization for Standardization or ISO) standard, among others.

The signal processing system 314 outputs packetized compressed streams and presents them as input for storage in the storage device, or in other implementations, as input to the media engine 322 for decompression by a video decompression engine (not shown) and an audio decompression engine (not shown) for display on the TV set 341. One having ordinary skill in the art will appreciate that the signal processing system 314 will preferably include other components not shown, including memory, decryptors, samplers, digitizers (e.g., analog-to-digital converters), and multiplexers, among other components. Further, it will be understood that one or more of the components listed above will interface with the processor 344 and/or system memory 349 (and/or dedicated memory for a particular component) to facilitate data transfer and/or processing of the video and/or audio signal for display and/or storage.

Memory 349, which may include volatile and/or non-volatile memory, stores one or more programmed software applications, herein referred to as applications, which contain instructions that may be executed by the processor 344 under the auspices of the operating system 353. Note that an application typically includes a client part and a server counterpart that cooperate to provide the complete functionality of the application. Data required as input by an application is stored in memory 349 and read by processor 344 from memory 349 as need be during the course of the application's execution. Input data for an application may be data stored in memory 349 by a secondary application or other source, either internal or external to the DHCT 16, or may be data that was created with the application at the time it was generated as a software application program. Data transmitted by the headend 11 may be received via the communications interface 342, whereas user input may be received from an input device via receiver 346. Data generated by an application is stored in memory 349 by the processor 344 during the course of the application's execution. Availability, location and amount of data generated by one application for consumption by another application is communicated by messages through the services of the operating system 353.

An executable program or algorithm corresponding to an operating system component, or to a client platform component, or to an application, or to respective parts thereof, can reside in memory 349, or in a local storage device (not shown) externally connected to or integrated into the DHCT 16 and be transferred into memory 349 for execution. Likewise, data input for an executable program can reside in the storage device and be transferred into memory 349 for use by an executable program or algorithm. In addition, data output by an executable program can be written into memory 349 by an executable program or algorithm and be transferred into the storage device. In other embodiments, the executable code is not transferred, but instead, functionality is effected by other mechanisms.

In the example DHCT 16 illustrated in FIG. 3, memory 349 may include several applications, including a media-on-demand (MOD) application 363, an e-mail application 365, a web browser application 366, an IPG application 394, a WatchTV application 362, and a Pay Per View (PPV) application 364. It should be clear to one with ordinary skill in the art that these applications are not limiting and merely serve as examples for embodiments of the disclosure. These applications, and others provided by the subscriber television system operator, are top-level software entities on the network for providing services to the user.

Memory 349 may also include a platform library 356. The platform library 356 is a collection of utilities useful to applications, such as a timer manager, a compression manager, a configuration manager, a hyper text markup language (HTML) parser, a database manager, a widget toolkit, a string manager, and/or other utilities (not shown). These utilities are accessed by applications via application programming interfaces (APIs) as necessary so that each application does not have to contain these utilities. Two components of the platform library 356 that are shown in FIG. 3 are a window manager 359 and a service application manager (SAM) client 357.

The window manager 359 includes a mechanism for implementing the sharing of the screen regions and user input. The window manager 359 on the DHCT 16 is responsible for, as directed by one or more applications, implementing the creation, display, and de-allocation of the limited DHCT screen resources. It allows multiple applications to share the screen by assigning ownership of screen regions, or windows. The window manager 359 communicates with the resource manager 367 to coordinate available resources (such as display memory) among different resource consuming processes. Such processes may be directly or indirectly invoked by one or more applications.

The SAM client 357 is a client component of a client-server pair of components, with the server component (not shown) being located on the headend 11, preferably in the DNCS 223 (FIG. 2). A SAM database 360 (i.e., structured data such as a database or data structure) includes a data structure of services and a data structure of channels that are created and updated by the headend 11. Herein, database will refer to a database, structured data or other data structures as is well known to those of ordinary skill in the art. Applications can also be downloaded into memory 349 at the request of the SAM client 357, typically in response to a request by the user or in response to a message from the headend 11.

An application referred to as a navigator 355 can also be resident in memory 349 for providing a navigation framework for services provided by the DHCT 16. For example, the navigator 355 is responsible for the detection of platform significant keypresses, such as a power-off button, a guide button, volume-up and volume-down buttons, a mute button (all not shown), among others. The navigator 355 thus communicates to the operating system 353 the status of the DHCT 16 (e.g., powered on or off). In one implementation, a device driver 311 informs the operating system 353 when a keypress event has been detected (e.g., via an infrared (IR) remote, IR keyboard, universal serial bus (USB) keyboard, etc.). The operating system 353 then notifies the application with the "front-most" display window of the keypress event. If the application has not registered an interest in that keypress event, it is then passed to the next closest window. Because the window manager 359 allows the operating system 353 to have a window that is logically "front-most," but may be invisible to the user, the operating system 353 has knowledge of the keypress event before passing the event along to an application with a window.

Many services can be defined using the same application component, with different parameters. Examples of services include, without limitation and in accordance with one implementation, presenting television programs (available through a WatchTV application 362), pay-per-view events (available through a PPV application 364), digital music (not shown), media -on-demand (available through an MOD application 363), games (available through a games application 361, wherein games can include poker, among others), and an interactive program guide (IPG) 394. In general, the identification of a service includes the identification of an executable application that provides the service along with a set of application-dependent parameters that indicate to the application the service to be provided. As an example, a service of presenting an HBO movie (a content instance) could be executed by the WatchTV application 362 with a set of parameters specifying HBO. Similarly, a service of presenting a poker game could be executed by the games application 361 with a set of parameters specifying poker. Each association of the application component (tune video) and one parameter component (HBO) represents a particular service that has a unique service I.D. The SAM client 357 also interfaces with the resource manager 367 to control resources of the DHCT 16.

Applications can be downloaded into memory 349 at the request of the SAM client 357, typically in response to a request by the user or in response to a message from the headend 11. In one implementation, applications executing on the DHCT 16 work with the navigator 355 by abiding by several guidelines. First, an application utilizes the SAM client 357 for the provision, activation, and suspension of services. Second, an application shares DHCT 16 resources with other applications and abides by the resource management policies of the SAM client 357, the operating system 353, and the DHCT 16. Third, an application handles situations where resources are only available with navigator 355 intervention. Fourth, when an application loses service authorization while providing a service, the application suspends the service via the SAM client 357 (the navigator 355 will reactivate an individual service application when it later becomes authorized). Finally, an application client, or application, is designed to not have access to certain user input keys reserved by the navigator 355 (i.e., power, channel +/−, volume +/−, etc.).

Computer functionality of the DHCT 16 is provided by the operating system 353. Among other modules, the operating system 353 includes the resource manager 367 that provides an interface to resources of the DHCT 16 such as, for example, computing resources. The operating system 353 further includes one or more device drivers, such as device driver 311, that works in cooperation with the operating system 353 to provide operating instructions for peripheral devices, such as the remote control device 480. The operating system 353 also includes a memory manager 368 and a master controller 326, in accordance with one embodiment of the disclosure. The memory manager 368 will be explained further below. The master controller 326 is an entity that prioritizes the unloading and reloading of applications, and through the cooperation with the SAM client 357, enables intelligent unloading and reloading of applications. The master controller 326 also dynamically receives input from applications informing the master controller 326 of the application's state (via state information). The master controller 326 is preferably in communication with an entity that understands which services are active. In one implementation, the entity that knows which services are active is the SAM client 357, as explained above. Note that in some embodiments, the functionality of the master controller 326 can be integrated into the SAM client 357, wherein the SAM client 357 is internal to or external to the operating system 353. In alternative embodiments, the master controller 326 can be a layer "on top of" the operating system 353, much like the SAM client 357.

The operating system 353 also includes a BFS client module 343 that cooperates with a server counterpart to provide a directory of modules such as applications. The directory and the modules are cyclically broadcast throughout the subscriber television system 10 (FIG. 1) and are thus readily available to DHCTs that need a particular application or other data.

The DHCT 16 can also include one or more wireless or wired interfaces, also called communication ports 374, for receiving and/or transmitting data to other devices. For instance, the DHCT 16 may feature USB (Universal Serial Bus), Ethernet (for connection to a computer), IEEE-1394 (for connection to content devices in an entertainment center), serial, and/or parallel ports. The user inputs may be, for example, provided by an input device including a computer or transmitter with buttons or keys (or input can be provided via buttons or keys on the exterior of the terminal) or by a handheld remote control device 480 or keyboard that includes user-actuated buttons, or even aural input (e.g., voice activated), among others.

Figure 4:
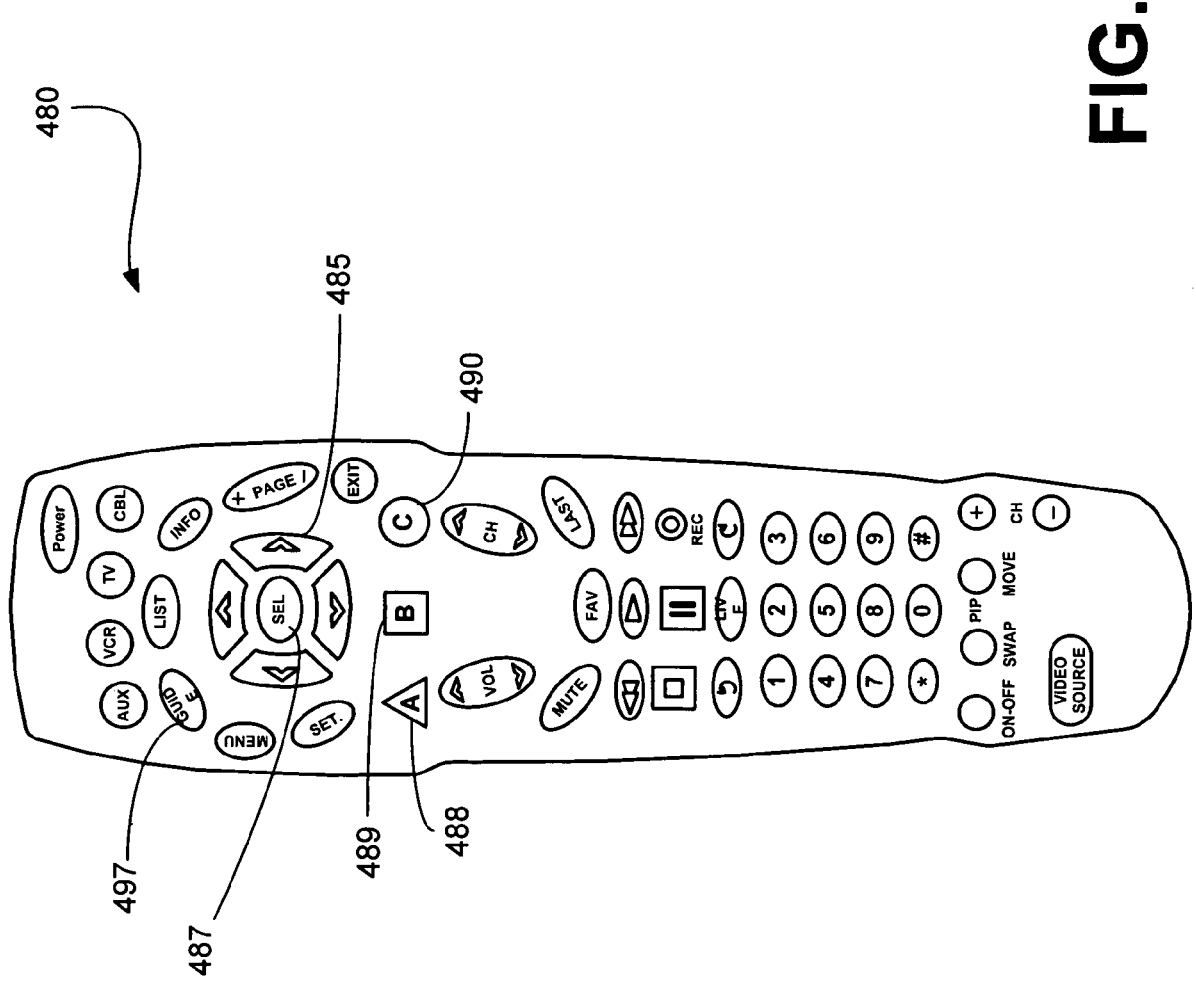
FIG. 4 is a schematic diagram of one example remote control device to provide input to the DHCT illustrated in FIG. 3, in accordance with one embodiment of the disclosure.

An example remote control device 480 to provide input to the DHCT 16 (FIG. 3) is illustrated in FIG. 4. The example remote control device 480 includes a select button 487 for making selections presented on a screen display, and navigation buttons 485 for navigating within a particular screen display. The guide button 497 may be used to access a television program guide such as, for example, an IPG screen. "A" 488, "B" 489, and "C" 490 buttons can correspond to certain application-defined functions that have a corresponding "A","B", or "C" symbol displayed in a graphic user interface (GUI) presented on a display device. Many alternative methods of providing user input may be used including a remote control device with different buttons and/or button layouts, a keyboard device, a voice activated device, etc. The embodiments of the disclosure described herein are not limited by the type of device used to provide user input.

The following screen diagrams will be used to illustrate one example implementation that uses applications to render requested services, and to show how the preferred embodiments of the disclosure can be used to provide seamless operations during the unloading and/or reloading of the applications to render these services. When a currently running application cannot receive the memory it requires, or a new application invoked by the user cannot be loaded due to limited memory, many systems unload all applications or unload some arbitrarily. Thus, one problem that can arise is determining which application to unload. For example, if an application that is stateful is unloaded, the user will come to know that it has been unloaded because when he or she reactivates that application (e.g., via tune channel or service portal), the application will be loaded, but it comes up in its initial state, which may confuse the user.

Figure 5:
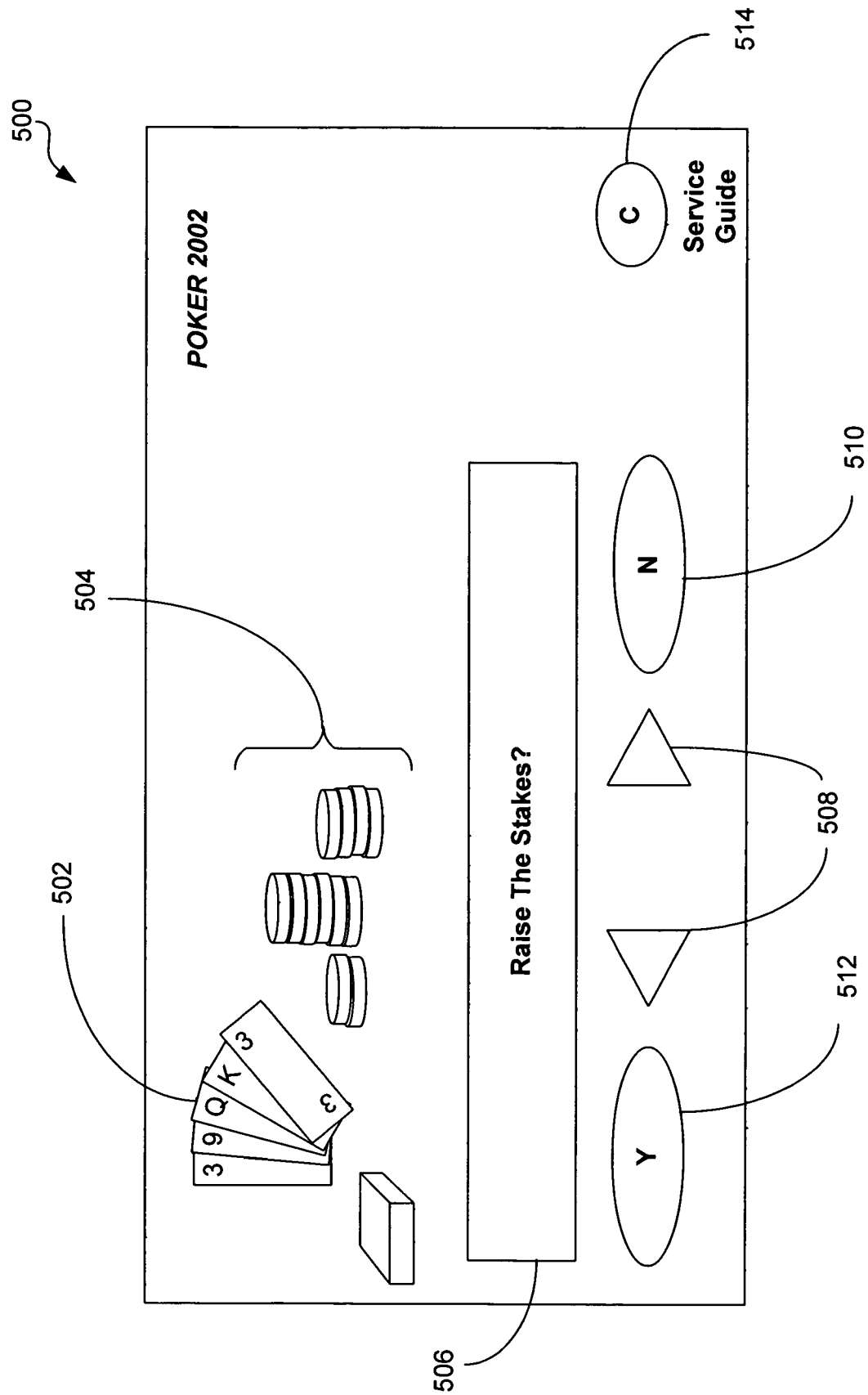
FIG. 5 is a screen diagram illustrating an example poker game that is in progress, in accordance with one embodiment of the disclosure.

For example, assume a user is in the midst of playing a poker game, as illustrated by the example poker game screen 500 shown in FIG. 5. The poker game can be invoked by a user through an interactive program guide (IPG) that accesses a service guide 600 (FIG. 6), as one example. As shown, the user is presented with a poker hand 502 and poker chips 504. The automated barker 506 asks the user whether he or she would like to "raise the stakes" (i.e., invest more money to support the current poker hand 502). The user is presented with navigation arrow icons 508 that, in one implementation, suggest to the user that he or she can select the navigation arrows 485 (FIG. 4) on the remote control device 480 (FIG. 4) to not "raise the stakes" ("no" button icon 510), or "raise the stakes" ("yes" button icon 512). Similarly, the user is presented with a "C" button icon 514 that suggests to the user that he or she can return to a service guide (such as the example service guide 600 shown in FIG. 6) via selecting a similarly labeled button ("C" button 490 (FIG. 4)) on the remote control device 480.

Figure 6:
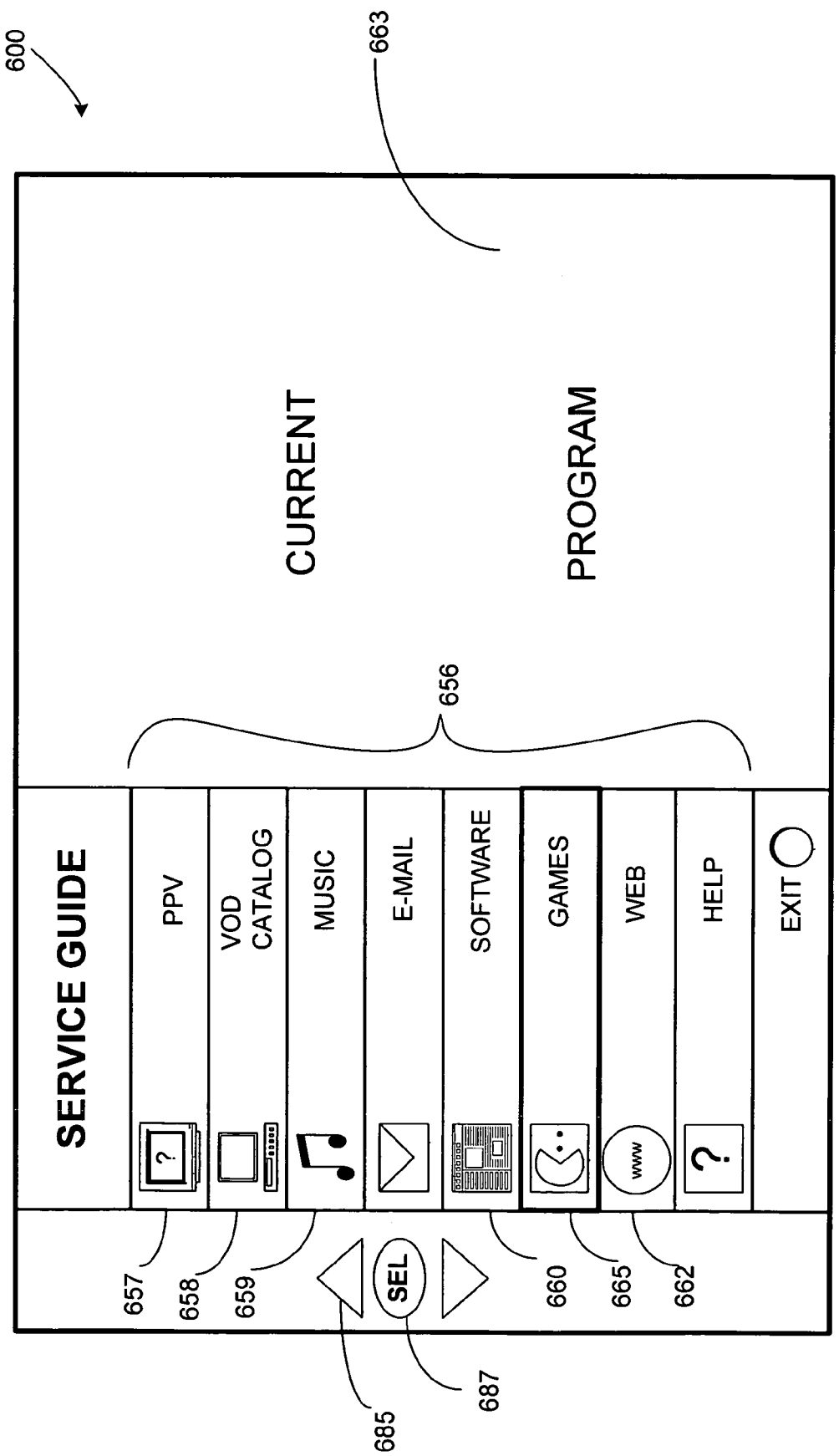
FIG. 6 is a screen diagram of an example service guide that a user can invoke while playing the poker game illustrated in FIG. 5, in accordance with one embodiment of the disclosure.

Assume the user, who now has poker chips on the line and a "live" poker hand 502, decides to see what is the latest news via accessing the world wide web. Before deciding whether to raise the stakes or not (i.e., before responding to the barker 506), the user selects the "C" button 490 (FIG. 4) as suggested by the service guide button icon 514 to invoke the service guide 600, as shown in FIG. 6, which presents the user with service selections. The example service guide 600 provides for a plurality of services 656, including PPV 657, VOD 658, Music 659, Software 660, Games 665, and Web access 662. The user can navigate to the various selections and select a desired service using the remote control device 480 (FIG. 4), as suggested by navigation arrow icons 685 and the select button icon 687. Note that there is a reduced portion 663 of the screen 600 available for a reduced picture of the current program. Although shown as a half-screen, other configurations may be used, such as quarter-screen. If the poker game is an "overlay" service, then it can place other services in the reduced portion 663 (e.g., WatchTV services), but the poker game itself cannot be placed in the reduced portion 633. If the poker game is a "channel-based" service, then it can be placed in the reduced portion 663. In one embodiment, if a service is active, it cannot be unloaded. For example, if a channel-based service is active (e.g., visible in the reduced portion 663) and the service guide is active (e.g., visible using the remainder of the screen), then neither can be unloaded.

A function key (e.g., button icon) may be provided in some overlay systems that enables the removal of the reduced portion 663, and if implemented, inactivates the channel-based service and enables removal of the reduced portion 663. In one embodiment, the poker game is channel-based and it can be displayed in the reduced portion 663. The user may press a button corresponding to a button icon (not shown) that replaces the web screen with a full screen, then the poker game can be unloaded. Then upon the user invoking the poker game again in the reduced portion 663, the poker game will have a screen displayed corresponding to its initial state. In some situations, the initial state may not be readily evident by simply invoking a display in the reduced portion 663 if the reduced portion only shows a logo corresponding to the service (e.g., if the screen display is not programmed to be displayed in the reduced portion 663).

Continuing with the example of invoking web access, upon selecting the Web access icon 662, the user is presented with the example screen 700 that provides the user with an HTML web page, through the Web browser application 366 (FIG. 3), that provides a series of icons for categories to choose from, including a News icon 702, Sports icon 704, Market Information icon 706, Weather icon 708, and Other information icon 710 (e.g., providing entertainment information, horoscope, etc.). The example screen 700 also presents the user with button icons A-C (712) that correspond to functionality that can be invoked by a user using similarly labeled buttons on the remote control device 480 (FIG. 4). From this example screen 700, the user can select the News icon 702 to learn about the latest news.

Underlying these user interactive services are dynamic DHCT mechanisms that enable one or more applications to be loaded. These applications can be loaded on demand and not in any predetermined order. A result of this flexibility is that when memory 349 (FIG. 3) of the DHCT 16 (FIG. 3) becomes full and additional applications cannot be loaded, an application is unloaded. In some embodiments, one or more applications may be queried to relinquish non-mandatory memory. Similarly, since the functionality and actions of individual applications loaded into memory 349 may not be known prior to the loading of them, it is possible that during execution of an application, memory 349 may become full. For example, many applications are "data-driven" and the application and the operating system do not know in advance how much memory will be required until the external data is accessed. In this case, an application can be picked and unloaded from the DHCT 16.

Figure 7:
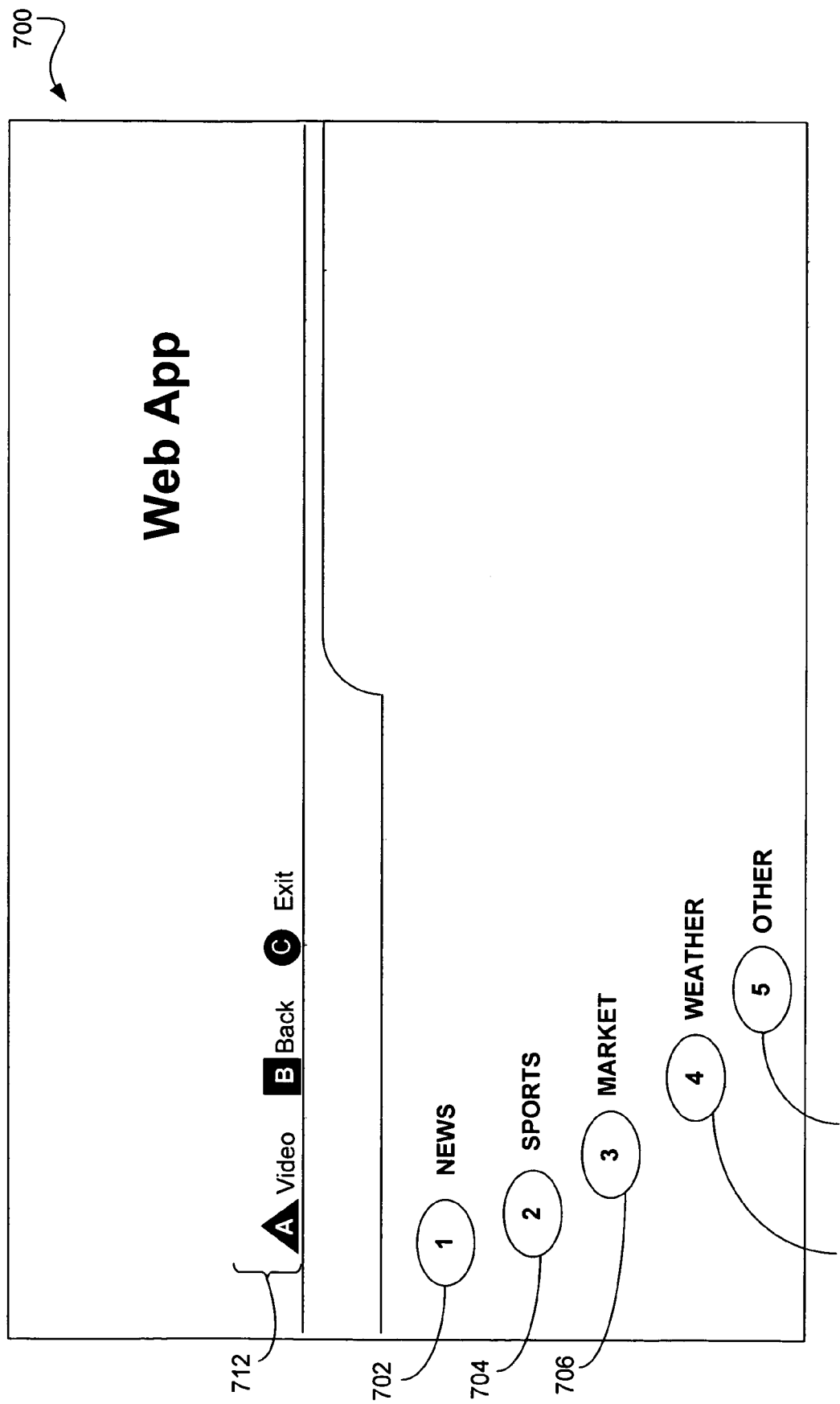
FIG. 7 is a screen diagram of an example web page that can be invoked by the user from the example service guide of FIG. 6, in accordance with one embodiment of the disclosure.

Typically, whenever an application is unloaded, its "disappearance" is transparent to the user. The user is not notified nor does the application undergo any unloading criteria mechanisms to, in a sense, "plea its case" as to why it should not be unloaded. The result is that, in conventional systems, applications holding user-specific state information will be unloaded and this user-specific state will be lost. When the user activates the application again, the application will be reloaded. It will start with a clean slate, often leaving the user confused as to what happened. As an illustration, and continuing the example illustrated in FIGS. 5-7, assume the user returns to the poker game as shown in FIG. 5 after checking out the latest news. FIG. 8 is an example screen diagram of an example poker game screen 800 displayed upon service initiation. As shown, the user is presented with an instruction barker 802 that prompts the user to select the number of players from the player number list 804, preferably using buttons on the remote control device 480 (FIG. 4) as suggested by the navigation arrow icons 806 and the select button icon 808. Considering the difference between this screen 800 and the screen 600 (FIG. 6) from which the user launched a search for current news, the user is likely to be confused by this screen 800 as it appears to be prompting the user to respond to questions reminiscent of the initial user interface screen (not shown) that was presented at the start of the poker game shown in FIG. 6. The user no longer has the hand he or she last played with, nor the poker chips accumulated during the last game. In other words, the user specific state information has been lost.

Confusion can be created in this implementation for one or more reasons. For example, the application responsible for the poker game (e.g., the games application 361, FIG. 3) may have been arbitrarily unloaded to make room in memory 349 (FIG. 3) for the application responsible for the web access (e.g., the Web Browser application 366, FIG. 3). Further, a games application 361 (providing the poker game service) may have been a stateful application, and the state was not saved. Applications running in the DHCT 16 (FIG. 3) can be generally grouped into two categories. One category can be referred to as stateless. For example, the application can be unloaded and reloaded with no or little distinction between the display or apparent operation between the old and new content instance. Another category can be referred to as stateful. For example, if the application is unloaded and reloaded, the new content instance will appear to operate in a different state than the old content instance.

Another example of a stateless application is a client application for a data push server. The client application is primarily acting on data received from the network. However, if this same application allows a user to select a category of data, then the application would become stateful. An email application is another example of a stateful application. For example, the user may be required to provide a username and password to access mail. Additionally, the user may have selected specific email messages to display. If this application was unloaded and reloaded, the user-specific state would be lost. The user would be required to provide his or her username and password again, in addition to once again selecting his or her email messages. An application can transition between stateful and stateless at run-time depending on user activity and/or requests.

The preferred embodiments of the disclosure address the problem of losing state, among other problems, according to several generalized goals: (1) ensure that the application state is not lost when an application is unloaded; and (2) inform the user of the consequences of unloading an application if an application must be unloaded. There are several underlying requirements that the preferred embodiments of the disclosure utilize to realize these goals: (i) if the state will be lost, applications should not be unloaded without notifying the user; (ii) if the state will be lost, applications should not be unloaded without receiving the users approval; however, if memory is absolutely necessary then user approval can be replaced with a notification; (iii) applications are provided a mechanism to store state information when they are unloaded; (iv) applications are provided a mechanism to request previously stored state information when they are loaded; (v) applications have an ability to check stored state information for chronological staleness; (vi) applications have an ability to check stored state information for version compatibility; and (vii) when picking an application to unload, applications that do not lose user state are preferably picked over applications that lose user state. Note that in some embodiments, state data may or may not be stored across DHCT reboots. Also, stored data may be discarded if necessary.

In the preferred embodiments, the master controller 326 (FIG. 3) allows one or more applications to notify it when an application state transitions from stateless to stateful, or from stateful to stateless. Referring to the flow diagram in FIG. 9A, an application preferably runs code as part of its standard operation (step 910). In step 915, the application receives an indication of an event (e.g., a signal corresponding to a keypress event). Certain events or "actions" may cause a state change to occur. For example, a poker application or the games application 361 (e.g., running poker) may switch from stateless to stateful when the user is at the main screen (not shown) and selects "deal cards" for the first time. The shuffled deck and dealt cards are now part of the user's state. As another example, an email application 365 (FIG. 3) may switch from stateful to stateless when the user selects "signoff" or "switch to other user." In this case no user specific messages are displayed and the email is in the same state as when its execution began.

In step 920, the application determines if the event will cause the application to become stateless or stateful. For example, assume a data broadcast service that presents as a "default" page upon "launch" a local weather page that includes information regarding the local weather. When the user is first presented with the local weather page, the application is considered stateless since the application in this example always launches with the local weather page. When the user transitions to another page (e.g., a local movies page that presents movie times and locations for locally-played movies), the application is now stateful.

If no changes in state occur, the application continues to run code (step 910). If a change in state occurs, then step 930 includes the application providing information to the master controller 326 (FIG. 3). The application then continues to run code (step 910). FIG. 9B is a programming diagram of an example applications programming interface (API) 940 that is preferably called by an application each time the application state transitions from stateless to stateful or from stateful to stateless. This API 940 enables the master controller 326 to make informed decisions regarding requests for unloading applications (e.g., requests via the SAM client 357, FIG. 3) and presenting the user with options and the result of unloading an application. Note that "uio" is a pointer to a Ctl_UnloadInfo structure, wherein the structure is defined according to the structure code 942 described in FIG. 9C. Note that the structure code 942 is for one example implementation, and other implementations with a variation in the code are contemplated to be within the scope of the preferred embodiments of the disclosure. For example, the structure code 942 supports ASCII strings, but other data structures can be used that support graphics, sounds, and/or almost any other type of user interaction. Further, although described using "C" programming language, other programming languages can be used to provide the corresponding functionality and are contemplated to be within the scope of the preferred embodiments of the disclosure.

Referring to FIG. 9C, line 944 is a standard C definition for a structure. The structure is called, "struct Ctl_UnloadInfo." Line 946 indicates that the first field of this structure contains a pointer to constant character (string) data. This contains an ASCII string. Line 948 indicates that the second field of this structure contains a pointer to constant character data. This contains an ASCII string. Line 950 indicates that the third field of this structure contains a pointer to constant character data. This string contains an ASCII string. If unloadMeStr or unloadStopStr are NULL, the option is not displayed. Line 952 indicates that the final parameter is Boolean (e.g., true or false), and further indicates whether the application has state to save (which can be restored if the application is reloaded). Line 954 ends the definition of the structure and informs a compiler which abbreviated name to use.

When an application notifies the master controller 326 (FIG. 3) that it is stateful, it may provide unload information. The unload information preferably provides one or more of the following functionality:

1. It can be used to explain to the user the effect of unloading the application. This is referred to as the "Unload Information Explanation."
2. It may provide choices to be presented to the user. These choices may give the user the ability to specify whether the action should or should not be performed, depending on whether the explained results are desirable or not. This is referred to as the "Unload Information Choices."
3. It may inform the master controller 326 whether or not the application is capable of creating a record of state information that the master controller 326 stores when the application is unloaded. When the application is reloaded, this state record is provided back to the application. This state information is referred to as the "State Record." State information is whatever the designer of the application decides the state information should be, unless directed otherwise. In the poker game example, state information may include number of players, current cards dealt, current order of cards remaining in the deck, poker chip amounts, etc. State information preferably will not include "application executables" or a specific memory address. In the preferred embodiments, the application operates under a premise that the operating system 353 (FIG. 3) has loaded its code.

Figure 10A:
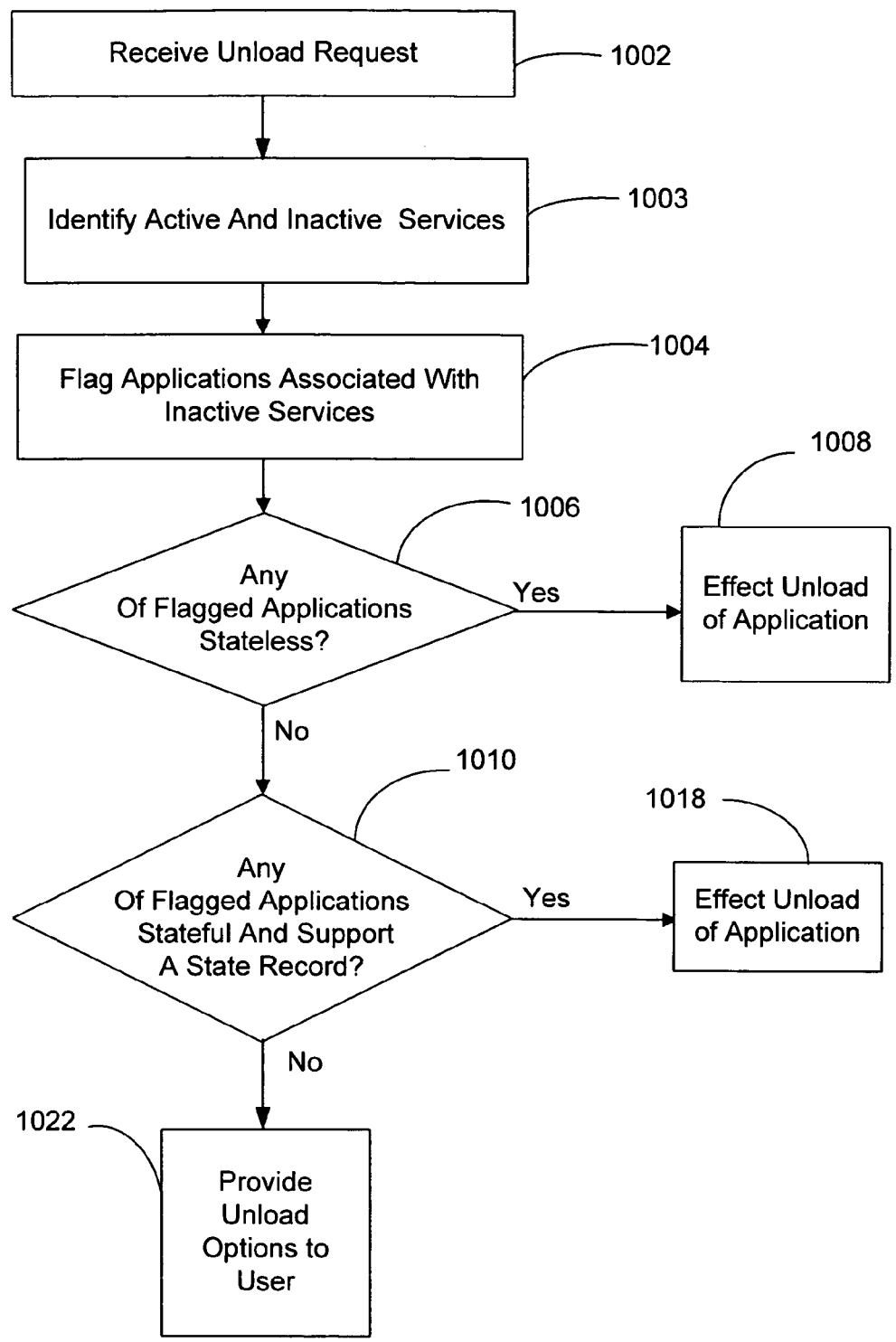
FIG. 10A is a flow diagram illustrating one example unloading priority method, in accordance with one embodiment of the disclosure.

Note that the unload information may or may not be presented to the user, depending on the state of the application. FIG. 10A provides a flow diagram of an example method used by the master controller 326 (FIG. 3) to prioritize the unloading of an application, in accordance with one embodiment of the disclosure. Step 1002 includes receiving an unload request. The unload request may occur in response to one or more events, such as a request (user or otherwise) to activate an application that consumes more memory (contiguous or otherwise) than is available. The operating system 353 (FIG. 3) preferably includes a memory manager 368 (FIG. 3). The memory manager 368 can determine the amount of memory available, and communicate an unload request to the master controller 326 (FIG. 3) upon determining that inadequate memory is available to load the requested application.

In other embodiments, a memory manager can operate "on top" of the process. That is, the memory manager is "unaware" of the process of unloading the application and simply reports a failure (e.g., inadequate memory) in response to a request for memory. An entity that requested memory would be responsible for the process of unloading applications. When the process of unloading is complete, the request to the memory manager would be repeated.

Returning to the prior discussion of the first master controller embodiment, in response to the unload request, the master controller 326 identifies which services are active and/or which services are not active (step 1003), and "flags" the corresponding inactive applications as candidates for unloading (step 1004). Preferably, this identification is done through the cooperation of the SAM client 357 (FIG. 3).

Step 1006 includes determining if any of the flagged applications are stateless. The master controller 326 (FIG. 3) recognizes that a stateless application can be unloaded without affecting the user experience (other than perhaps load time). If a flagged application is stateless, the master controller 326 effects (via cooperation with the SAM client 357, FIG. 3) an unloading of that application (step 1008). If none of the flagged applications are stateless, then step 1010 includes determining whether any of the flagged applications are stateful and support a state record. The unload information supported by the application informs the master controller 326 whether the application supports a state record. If any of the flagged applications are stateful and support a state record, step 1018 includes effecting the unloading (removal) of the application (step 101 8).Note that the entire unload information process enumerated above (e.g., 1-3) is preferably not utilized at this stage, just the unloading of state information of the application, with the expectation that when reloaded, the application will retrieve its state record (if necessary). and operate as if never unloaded. If any of the flagged applications are not stateful and do not support a state record, operations proceed to step 1022, further described below.

Figure 10B:
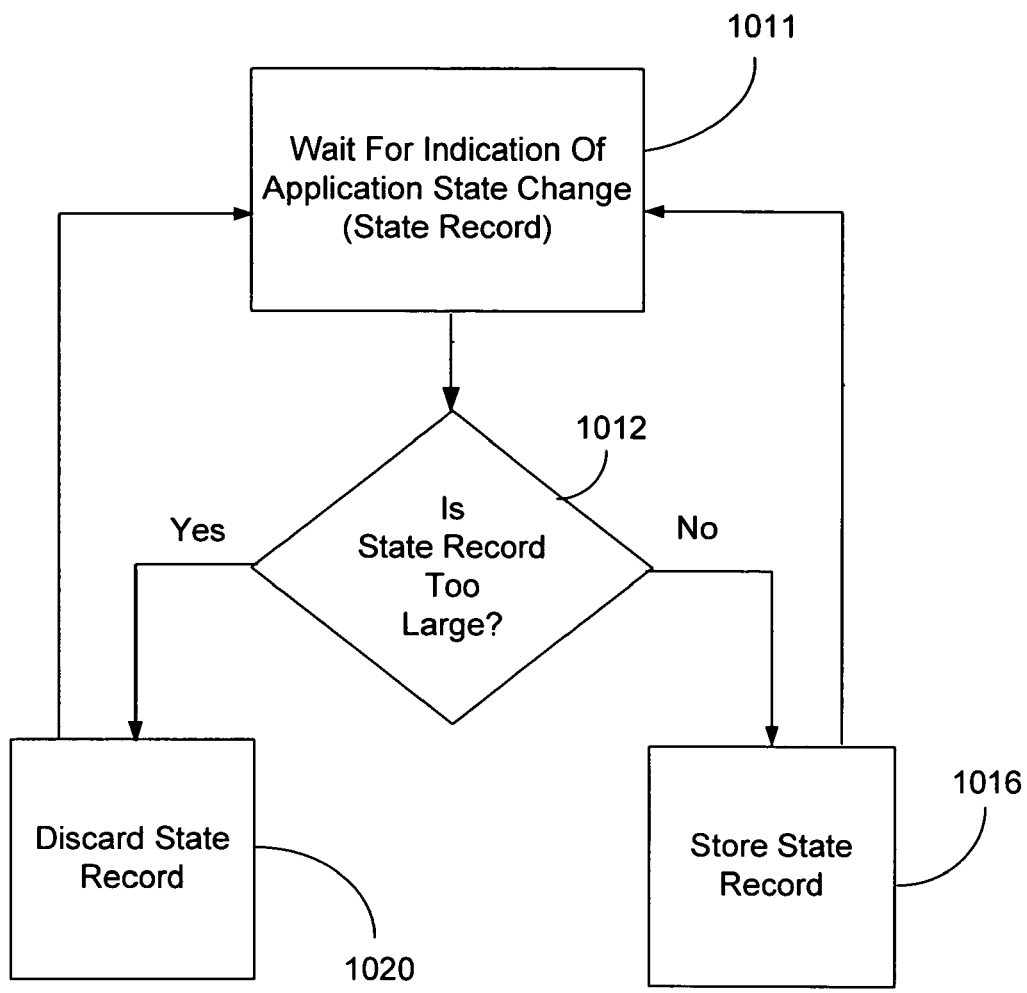
FIG. 10B is a flow diagram illustrating a "push-model" mechanism for a master controller to receive state information, in accordance with one embodiment of the disclosure.

In one embodiment, the master controller 326 (FIG. 3) receives the state record from the application in what can be referred to as a "push-model" approach or mechanism. In the "push-model" mechanism, an application calls an API when its state changes. FIG. 10B is a flow diagram that illustrates this mechanism from the perspective of the master controller 326. In step 1011, the master controller 326 (FIG. 3) waits for an indication of an application state change, which is preferably the receipt of a state record. Responsive to receiving the state record, the master controller 326 (FIG. 3) performs an internal query to determine whether the state record is too large (step 1014), the size gauged in absolute or relative terms. For example, the size could be a configuration parameter received from the headend 11 (FIG. 2) or an absolute value (default) if no configuration parameter is received. If the state record is not too large, the master controller 326 stores the state record (step 1016) (or replaces an existing state record) and then operations continue at step 1011. If an application provides a state record that the master controller 326 (FIG. 3) believes is too large, the master controller 326 (FIG. 3) may discard the state record (step 1020), and operations proceed to step 1011. In discarding information, the master controller 326 can provide notice to the application that no state information exists for the application.

Note that variations of the above mentioned method steps can be implemented. For example, using additional data configured by the system operator, it may be possible to create a priority method that allows some stateful applications to be unloaded before stateless applications. This may prove useful in circumstances where, for example, the MSO (media services organization) simply wanted an application to remain in the DHCT 16 (FIG. 3) as long as possible, thus providing quick access, whether or not it is stateful or stateless. Levels of priority can be created. For example, all level-N applications would be considered for unloading before any level-(N–1) applications. Within a single level, stateless applications would be unloaded before stateful applications.

Another variation to the methodology described in association with FIG. 10A involves the receiving or active requesting of the state record (step 1012) by the master controller 326 (FIG. 3), which can generically be referred to as a "pull-model" approach. In other words, the master controller 326 pulls the state information from the application.

FIG. 10C is a programming diagram that illustrates an example API 1040 that enables an application to provide state information to the master controller 326 (FIG. 3). An application makes this call when it is terminating operation (e.g., when it is about to be unloaded from memory). The API 1040 instructs the master controller 326 to associate the state record information the application provides with the application name. Note that "appName" is a unique module name, and Ctl_StateRecord is a data structure, the latter which is defined according to the structure code 1042 in FIG. 10D.

Referring to FIG. 10D, line 1046 indicates a data structure that is used to store arbitrary data, with the imposition that the data include a version to enable an application to determine whether any saved state is compatible with the version of the application being loaded. Line 1048 indicates that a field is declared for the version. Lines 1050 and 1052 indicate that two fields hold private data. In line 1050, the first field is to contain the number of bytes of private data that exist. In line 1052, the second field is an array of bytes of the same size specified above. This array of bytes is the private data, which is understood to include a collection of data that is only understood by the application (and thus is "private" to that application).

For example, in a data broadcast service as described above, the application may want to save the currently-selected page (a non-default page such as the local movies page) as the state. Several mechanisms can be employed to implement saving the page as the state, such as by using a unique number referencing the page or an ASCII string with the page name, among others. Assume the aforementioned ACII string method is used. If the user selected "movies playing," then the field in line 1050 would contain 15 (e.g., the number of characters in the string "movies playing" plus a NULL terminator). This assumes a "C" programming language style string, with the understanding that the string can be represented using other programming languages and formats. Continuing the example, the "private data" in line 1052 is the individual bytes comprising the string "movies playing." Since typically the "C" programming language prohibits a strictly variable-sized array, the syntax "privateData[1]" is included with a comment to indicate there is likely more than 1-byte of private data to be used. The end of the structure is represented by line 1054.

A state record includes data of a size appropriate for the typical memory availability in a DHCT 16 (FIG. 3). The state record preferably stores the application state. The internal format of the state record is private to the application. Preferably, the master controller 326 (FIG. 3) supports an application version that is tied to the state record. This ensures that if a different version of the application is loaded, the application does not retrieve an incompatible state record (e.g., one that it does not understand). When a request to terminate is received, an application builds its private state record data and provides this data to the master controller 326. Similarly, an application supporting a state record queries the master controller 326 when it begins execution to retrieve a state record from a previous execution. The master controller 326 automatically provides the time and date of the state record creation (not shown). Because an Application Identifier (App_ID) may not be constant across multiple loadings, the application preferably uses its unique module name to store and retrieve the state record. While it is optimal when all applications support a state record, some applications may not be able to "compress" their state into a manageably sized state record. For this reason some applications may intentionally not support a state record.

The state record may be stored using the registry of the operating system 353 (FIG. 3). The registry is a mechanism provided by the operating system 353 that enables information to be saved in a hierarchical manner. This information is persistent, even when applications are unloaded. For example, a branch in the registry called "AppState" can be created and entries for each application can be associated with this branch, such as the entry "SuperPoker." Finally, associated with "Appstate/SuperPoker" can be the state information that is provided to the ctl_SetStateRecord API 1040 (FIG. 10C).

Note that the state record may be stored in non-volatile memory, a local hard-drive, transmitted to the headend 11 (FIG. 2) for storage, and/or other mechanisms that allow persistent storage.

FIG. 10E is a programming diagram that illustrates an example API 1044 that enables an application to retrieve state information from the master controller 326 (FIG. 3). The API 1044 allocates memory on behalf of the application and returns state information associated with the specified application name. Referring to the previously described data broadcast service example, the application typically does not know whether it needs 15 bytes to retrieve the state or 200 bytes. Because the state information may not be of a known size, this API 1044 returns a copy of the entire data. This is in contrast to, although does not preclude in some embodiments, copying the data into memory previously allocated by the calling application. Since the calling application generally does not know the appropriate size, returning a copy facilitates memory management and clearly defines ownership of the data. An application preferably makes this API call when it is beginning execution. If a state record exists for the specified application name, then the state information corresponding to the "stateRecord" is preferably returned and it is the responsibility of the calling application to free up memory that is no longer needed (e.g., when done with the data). Additionally, the calling application must check the version number for compatibility. Once a state record is returned, future calls to "GetStateRecord" with the same "AppName" will result in NULL for the stateRecord parameter, until SetStateRecord is called. In other words, when an application calls "ctl_GetStateRecord," the information is taken out of the master controller's database and provided to the application.

The master controller 326 may also discard state records that have reached an expiration age, such as 1 day. The expiration age can be configured by the MSO or programmed at the headend 11 (FIG. 2), or in the absence of a parameter, a default can be built-into the code as suggested above. The master controller 326 automatically purges old records. However, in some embodiments, an application can also encode time/date information into its own state information and perform more granular temporal conditions. For example, an application can decide to use a shorter duration for "staleness" than the master controller 326 by encoding the time into the state record and then, upon receiving the state record back when reloaded, making a decision about whether to ignore the state record even if it exists.

If it is determined that the flagged applications are stateful but do not support a state record (in step 1010), then the master controller 326 (FIG. 3) may utilize the Unload Information Explanation and Unload Information Options as described above and inform the user the result of unloading the application. The user may be allowed to choose between the unload information options (step 1022).

Figure 11:
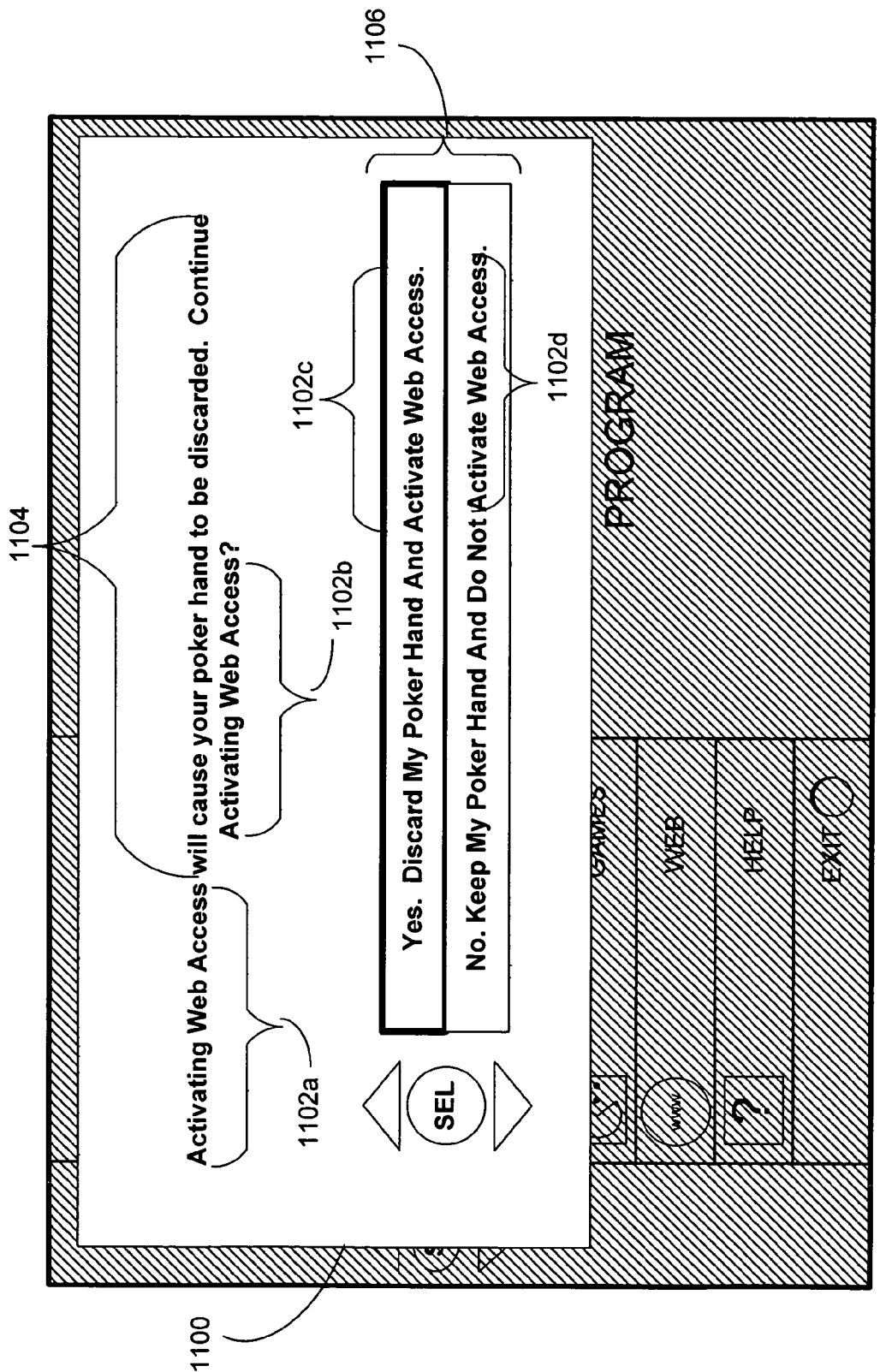
FIG. 11 is a screen diagram of an example user information barker overlaid on the example service guide illustrated in FIG. 6, in accordance with one embodiment of the disclosure.

FIG. 11 is a screen diagram that illustrates one example user information barker 1100 that can be presented to the user in response to the user seeking to invoke another service that creates a memory unloading problem, in accordance with one embodiment of the disclosure. For example, the example user information barker 1100 can be presented in response to the user selecting the Web access service 662 (FIG. 6) while in the service guide screen 600 (FIG. 6) and while a poker game is running. The user information barker 1100 can include several elements. The action string 1102*a,b* specifies the action taken by the user or any other event that triggered the application unload. In this case, the triggering action was the user selecting the Web access service 662, and thus the action string 1102*a,b* is, "Activating Web Access." Other example actions strings may include, but are not limited to, "Activating Movies-on-Demand," "Rebooting the Set-Top," "Accessing the address book," among others.

Another element of the user information barker 1100 includes an Unload Information (UI) Explanation 1104. As described above, the Unload Information Explanation is provided by the application and used by the master controller 326 (FIG. 3) to explain to the user the result of unloading the application. The final text explanation presented to the user is the result of a text string provided in the UI Explanation 1104 and a substitution. In one implementation, any text within the UI Explanation 1104 containing "%1" (percent sign followed immediately by the number one) is replaced with the action string 1102a,b. For example, a poker application's UI explanation 1104 may include:

%1 will cause your poker hand to be discarded.
Continue %1?

If loading the Web Browser application 366 (FIG. 3) triggers the request to unload the games application 361 (FIG. 3) running poker, the action string 1102a,b would be "Activating Web Access." The final message displayed on the screen would be Activating Web Access will cause your poker hand to be discarded. Continue Activating Web Access?

The master controller 326 (FIG. 3) can display the UI Explanation 1104 along with any Unload Information (UI) Choices 1106 at the same time. The UI Choices 1106 include unloading the application and not unloading the application. Like the UI Explanation 1104, the messages displayed in the UI Choices 1106 are the result of a text substitution. The action string 1102c,d is substituted wherever a UI Choice 1106 includes "%1." For example, "Yes, discard my poker hand and %1, " and "No, keep my poker hand and do not %1, " become after substitution, "Yes, discard my poker hand and Activate Web Access," and "No, keep my poker hand and do not Activate Web Access," respectively.

If the user selects the unload option, the games application 361 running poker will be instructed to terminate. If the "not-unload" option is selected, the games application 361 will not be instructed to terminate and the application requesting the memory will be told the request failed and should not be retried. If a user selects the "not-unload" option, the process of reclaiming memory will preferably terminate, and the process will not continue on to the next application. In other embodiments, the process will continue for another application.

Note that the embodiments described above assume the unloading of a single application at a time, such that an application is either stateless, stateful with a state record, or stateful with no state record. In some embodiments, there may be more than one stateless application, or no stateless applications but more than one stateful application, among other combinations, which leads to further questions of priority for unloading. Criteria for prioritizing can vary based on the implementation. For example, priority schemes can be used, including unloading the application that consumes the largest amount of memory, unloading the application that has not been used for the longest period of time, unloading based on a priority assigned by an MSO, unloading by assigned levels as described above, or unloading all the applications in memory, among others.

Further, although described in the context of unloading from memory 349 (FIG. 3), one skilled in the art would also understand, based on the description herein, that the preferred embodiments can also be extended to prioritizing applications and other data in storage devices (e.g., hard disk drives, etc.).

Figure 9A:
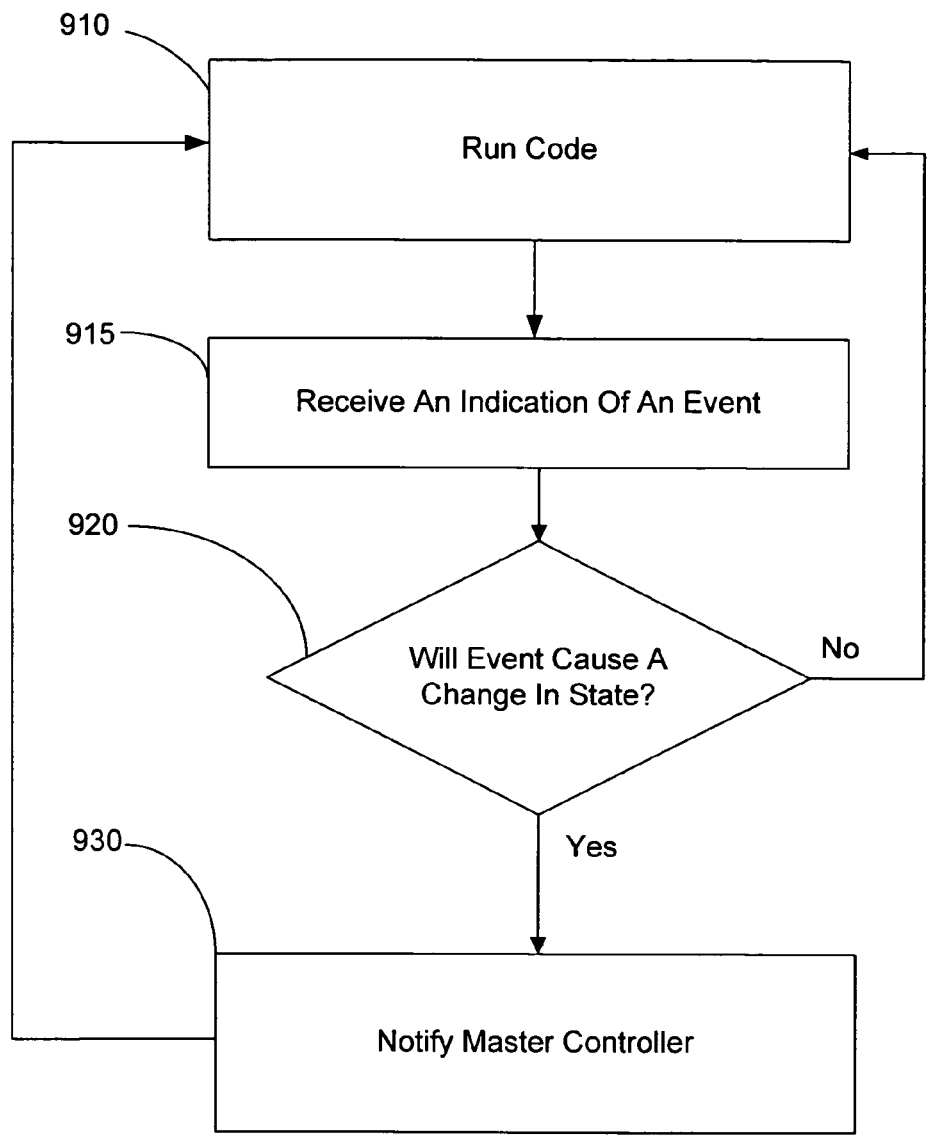
FIG. 9A is a flow diagram illustrating one example method employed by an application to inform a master controller of a change in state, in accordance with one embodiment of the disclosure.

The blocks in the flow diagrams of FIGS. 9A and 10A and 10B should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

The master controller 326 (FIG. 3) can be implemented in hardware, software, firmware, or a combination thereof. In the preferred embodiment(s), the master controller 326 is implemented in software or firmware that is stored in a memory and that is executed by a suitable instruction execution system. If implemented in hardware, as in an alternative embodiment, the master controller 326 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The master controller 326 which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present disclosure, particularly, any "preferred embodiments" are merely possible examples of implementations, merely setting forth a clear understanding of the principles of the disclosures. Many variations and modifications may be made to the above-described embodiments of the disclosure without departing substantially from the spirit of the principles of the disclosure. All such modifications and variations are intended to be included herein within the scope of the disclosure and present disclosure and protected by the following claims.

Therefore, having thus described the disclosure, at least the following is claimed:

1. A method for managing memory, the method comprising:
   receiving an application state from each of a plurality of applications in memory, wherein each said application includes a plurality of operational stages, and wherein each application state indicates a presence of differences between a first operational stage of a corresponding activated application at a point when memory is evaluated for application removal and a second operational stage of the corresponding application upon being unloaded from the memory and reactivated, wherein said receiving the application state from each of the plurality of applications in memory includes:
      receiving an information object along with the application state, the information object being associated with at least one of the following: results of application unloading, presentation options in conjunction with the application unloading, and at least one of: graphics, text, and sound to be provided along with the presentation options;
      receiving a first stateful state with a state record indicating an absence of said differences between said first operational stage and said second operational stage, and
      no significant ones of user perceivable differences between said activated and reactivated application; and
   determining which of the plurality of applications to effect removal from the memory based on the received application states and associated pre-determined application priorities, the predetermined application priorities comprising a plurality of varying priority schemes comprising: unloading the application that consumes the largest amount of memory, unloading the application that has not been used for the longest period of time, unloading based on a priority assigned by a media services organization (MSO), unloading by assigned levels, and unloading the plurality of applications in the memory, where the plurality of varying priority schemes are utilized based on an implementation for effecting removal from the memory based on the received application states, wherein if more than one application has an identical state and an identical priority further determining which of the plurality of applications to effect removal from the memory based on inactivity time for the respective applications as indicated by a flag setting, wherein an application with a corresponding application state indicating the absence of said differences between said first operational stage and said second operational stage is to be removed from the memory before other applications with application states indicating the presence of said differences between said first operational stage and said second operational stage.

2. The method of claim 1, wherein said receiving the application state from each of the plurality of applications in memory further includes receiving one of:
   a stateless state indicating the absence of said differences between said first operational stage and said second operational stage and no significant ones of user perceivable differences between said activated and reactivated application, and
   a second stateful state with no state record indicating the presence of said differences between said first operational stage and said second operational stage and the presence of said user perceivable differences between said activated and reactivated application.

3. The method of claim 2, wherein said receiving the stateless state includes receiving an indication that a user would perceive no significant difference between a presentation associated with one of the plurality of applications before and after being unloaded from the memory and reactivated.

4. The method of claim 1, wherein said receiving the first stateful state with the state record includes receiving an indication that a user would perceive no significant difference between a presentation associated with one of the plurality of applications before and after being unloaded from the memory and reactivated because the state is saved in the state record.

5. The method of claim 4, further including effecting the removal of the application with the first stateful state with the state record and saving the state record.

6. The method of claim 5, further including, responsive to a user activating the removed application, restoring the removed application with the saved state record.

7. The method of claim 2, wherein said receiving the second stateful state with no state record includes receiving an indication that a user would perceive a difference between a presentation associated with one of the plurality of applications before and after being unloaded from the memory and reactivated.

8. The method of claim 7, wherein said receiving the second stateful state with no state record includes receiving unload information, wherein the unload information includes at least one of an unload information explanation and unload information choices.

9. The method of claim 2, wherein said determining which of the plurality of applications to effect removal includes determining that an application with the stateless state is removed before an application with the first stateful state with the state record, and that an application with the first stateful state with the state record is removed before an application with the second stateful state with no state record.

10. The method of claim 2, further including effecting the removal of an application with the stateless state before the removal of an application with the first stateful state with the state record, and effecting the removal of an application with the first stateful state with the state record before the removal of an application with the second stateful state with no state record.

11. The method of claim 2, further including providing an explanation to a user when an application to be removed from the memory includes the second stateful state with no state record, wherein the explanation informs the user the result of removing the application.

12. A method for managing memory, the method comprising:
   receiving an indication that memory space is needed in memory;
   receiving an application state from each of a plurality of applications in memory, wherein each said application includes a plurality of operational stages, and wherein each application state indicates a presence of differences between an activated operational stage of a corresponding activated application at a point when memory is evaluated for application removal and a reactivated operational stage of the corresponding application upon being unloaded from the memory and reactivated and, wherein said receiving an application state includes receiving:
      an information object along with the application state, the information object being associated with at least one of the following: results of application unloading, presentation options in conjunction with the application unloading, and at least one of: graphics, text, and sound to be provided along with the presentation options;

a stateless state indicating an absence of said differences between said activated and reactivated operational stages and no significant ones of user perceivable differences between said activated and reactivated application, a first stateful state with a state record indicating the absence of said differences between said activated and reactivated operational stages and no significant ones of said user perceivable differences between said activated and reactivated application, and a second stateful state with no state record indicating the presence of said differences between said activated and reactivated operational stages and the presence of said user perceivable differences between said activated and reactivated application;

determining which of the plurality of applications to effect removal from the memory based on the received application state for each of the plurality of applications in memory and associated pre-determined application priorities, the predetermined application priorities comprising a plurality of varying priority schemes comprising: unloading the application that consumes the largest amount of memory, unloading the application that has not been used for the longest period of time, unloading based on a priority assigned by a media services organization (MSO), unloading by assigned levels, and unloading the plurality of applications in the memory, where the plurality of varying priority schemes are utilized based on an implementation for effecting removal from the memory based on the received application states, wherein if more than one application has an identical state and an identical priority further determining which of the plurality of applications to effect removal from the memory based on inactivity time for the respective applications as indicated by a flag setting, wherein said determining includes determining that an application with the stateless state is to be removed before an application with the first stateful state with the state record, and that an application with the first stateful state with the state record is to be removed before an application with the second stateful state with no state record; and effecting the removal of determined ones the plurality of applications.

13. A system for managing memory, said system comprising:

a memory with logic; and a processor configured with the logic to:

receive an application state from each of a plurality of applications in memory, wherein each said application includes a plurality of operational stages, and wherein each application state indicates a presence of differences between first operational stage of a corresponding activated application at a point when memory is evaluated for application removal and a second operational stage of the corresponding application upon being unloaded from the memory and reactivated, wherein the application state further includes a first stateful state with a state record indicating an absence of said differences between said first operational stage and said second operational stage and no significant ones of user perceivable differences between said activated and reactivated application;

receive an information object along with the application state, the information object being associated with at least one of the following: results of application unloading, presentation options in conjunction with the application unloading, and at least one of: graphics, text, and sound to be provided along with the presentation options; and determine which of the plurality of applications to effect removal from the memory based on the received application states and associated pre-determined application priorities, the predetermined application priorities comprising a plurality of varying priority schemes comprising: unloading the application that consumes the largest amount of memory, unloading the application that has not been used for the longest period of time, unloading based on a priority assigned by a media services organization (MSO), unloading by assigned levels, and unloading the plurality of applications in the memory, where the plurality of varying priority schemes are utilized based on an implementation for effecting removal from the memory based on the received application states, wherein if more than one application has an identical state and an identical priority further determining which of the plurality of applications to effect removal from the memory based on inactivity time for the respective applications as indicated by a flag setting, wherein an application with an application state indicating the absence of said differences between said first operational stage and said second operational stage is to be removed from the memory before other applications with application states indicating the presence of said differences between said first operational stage and said second operational stage.

14. The system of claim 13, wherein said application state further includes one of:

a stateless state indicating the absence of said differences between said first operational stage and said second operational stage and no significant ones of user perceivable differences between said activated and reactivated application, and a second stateful state with no state record indicating the presence of said differences between said first operational stage and said second operational stage and the presence of said user perceivable differences between said activated and reactivated application.

15. The system of claim 14, wherein the stateless state indicates that a user would perceive no significant difference between a presentation associated with one of the plurality of applications before removal from the memory and after reactivation.

16. The system of claim 13, wherein the first stateful state with the state record indicates that a user would perceive no significant difference between a presentation associated with one of the plurality of applications before removal from the memory and after reactivation because the state is saved in the state record.

17. The system of claim 16, wherein the processor is further configured with the logic to effect the removal of the application with the first stateful state with the state record and save the state record.

18. The system of claim 17, wherein the processor is further configured with the logic to, responsive to a user activating the removed application, restore the removed application with the saved state record.

19. The system of claim 14, wherein the second stateful state with no state record indicates that a user would perceive a difference between a presentation associated with one of the plurality of applications before removal from the memory and after reactivation.

20. The system of claim 19, wherein the processor is further configured with the logic to provide unload information, wherein the unload information includes at least one of an unload information explanation and unload information choices.

21. The system of claim 14, wherein the processor is further configured with the logic to determine that an application with the stateless state is removed before an application with the first stateful state with the state record, and that an application with the first stateful state with the state record is removed before an application with the second stateful state with no state record.

22. The system of claim 13, wherein the processor is further configured with the logic to effect the removal of an application with a stateless state before the removal of an application with the first stateful state with the state record, wherein the processor is further configured with the logic to effect the removal of an application with the first stateful state with the state record before the removal of an application with a second stateful state with no state record.

23. The system of claim 13, wherein the processor is further configured with the logic to provide an explanation to a user when an application to be removed from the memory includes a second stateful state with no state record, wherein the explanation informs the user the result of removing the application.

* * * * *